US011709481B2

(12) United States Patent
Sayyarrodsari et al.

(10) Patent No.: US 11,709,481 B2
(45) Date of Patent: *Jul. 25, 2023

(54) CONTEXTUALIZATION OF INDUSTRIAL DATA AT THE DEVICE LEVEL

(71) Applicant: Rockwell Automation Technologies, Inc., Mayfield Heights, OH (US)

(72) Inventors: Bijan Sayyarrodsari, Austin, TX (US); Michael Pantaleano, Milwaukee, WI (US); Ka H Lin, Brampton (CA); Juergen K Weinhofer, Chagrin Falls, OH (US); Andrew J Ellis, Burlington (CA); Kyle Crum, Bayside, WI (US); Sujeet Chand, Brookfield, WI (US); David Vasko, Hartland, WI (US); Subbian Govindaraj, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,257

(22) Filed: Aug. 25, 2022

(65) Prior Publication Data

US 2022/0404803 A1     Dec. 22, 2022

Related U.S. Application Data

(63) Continuation of application No. 16/587,214, filed on Sep. 30, 2019, now Pat. No. 11,435,726.

(51) Int. Cl.
  *G05B 19/418* (2006.01)
  *H04W 4/38* (2018.01)
  (Continued)

(52) U.S. Cl.
  CPC ... *G05B 19/4183* (2013.01); *G06K 19/07758* (2013.01); *G06N 20/00* (2019.01); *H04W 4/38* (2018.02)

(58) Field of Classification Search
  CPC ...... G05B 19/4183; H04W 4/38; G06N 20/00
  (Continued)

(56) References Cited

U.S. PATENT DOCUMENTS 6,202,038 B1   3/2001   Wegerich et al.
6,338,038 B1   1/2002   Hanson
(Continued)

FOREIGN PATENT DOCUMENTS

CN   103217935 A   7/2013
CN   103685442 A   3/2014
(Continued)

OTHER PUBLICATIONS

Givehchi, Omid, Henning Trsek, and Juergen Jasperneite. "Cloud computing for industrial automation systems—a comprehensive overview." 2013 IEEE 18th Conference on Emerging Technologies & Factory Automation (ETFA). IEEE, 2013.pp.1-4 (Year: 2013).*

(Continued)

*Primary Examiner* — Satish Rampuria
(74) *Attorney, Agent, or Firm* — Amin, Turocy & Watson, LLP

(57) ABSTRACT

An industrial device supports device-level data modeling that pre-models data stored in the device with known relationships, correlations, key variable identifiers, and other such metadata to assist higher-level analytic systems to more quickly and accurately converge to actionable insights relative to a defined business or analytic objective. Data at the device level can be modeled according to modeling templates stored on the device that define relationships between items of device data for respective analytic goals (e.g., improvement of product quality, maximizing product throughput, optimizing energy consumption, etc.). This device-level modeling data can be provided to higher level systems together with their corresponding data tag values to (Continued)

high level analytic systems, which discovers insights into an industrial process or machine based on analysis of the data and its modeling data.

20 Claims, 22 Drawing Sheets

(51) Int. Cl.
 *G06N 20/00* (2019.01)
 *G06K 19/077* (2006.01)
(58) Field of Classification Search
 USPC .................................................. 700/108–116
 See application file for complete search history.

(56) References Cited

U.S. PATENT DOCUMENTS

| | | | |
|---|---|---|---|
| 6,421,571 | B1 | 7/2002 | Spriggs et al. |
| 8,031,638 | B2 | 10/2011 | Ackermann et al. |
| 8,616,134 | B2 | 12/2013 | King et al. |
| 8,674,993 | B1 | 3/2014 | Fleming et al. |
| 8,732,658 | B2 | 5/2014 | Plache et al. |
| 8,812,684 | B1 | 8/2014 | Hood et al. |
| 8,967,051 | B2 | 3/2015 | King et al. |
| 9,152,632 | B2 | 10/2015 | Smith et al. |
| 9,217,998 | B2 * | 12/2015 | Plache ............... G05B 19/4188 |
| 9,329,751 | B2 | 5/2016 | Bardhan |
| 9,346,371 | B2 | 5/2016 | King et al. |
| 9,411,864 | B2 | 8/2016 | Glinder et al. |
| 9,645,979 | B2 | 5/2017 | Shinzato |
| 9,760,601 | B2 | 9/2017 | Burke et al. |
| 9,771,000 | B2 | 9/2017 | King et al. |
| 9,866,635 | B2 | 1/2018 | Maturana et al. |
| 9,958,860 | B2 | 5/2018 | Rischar et al. |
| 10,048,995 | B1 | 8/2018 | Dikhit et al. |
| 10,112,777 | B2 | 10/2018 | King et al. |
| 10,442,637 | B2 | 10/2019 | Huang et al. |
| 10,459,832 | B2 | 10/2019 | Branson et al. |
| 10,528,700 | B2 | 1/2020 | Thomsen et al. |
| 10,740,298 | B2 | 8/2020 | Watson et al. |
| 10,809,692 | B2 | 10/2020 | Bisse et al. |
| 10,878,020 | B2 | 12/2020 | Pai |
| 11,249,462 | B2 | 2/2022 | Thomsen et al. |
| 2002/0029205 | A1 | 3/2002 | Pedraza et al. |
| 2002/0077711 | A1 | 6/2002 | Nixon et al. |
| 2002/0193888 | A1 | 12/2002 | Wewalaarachchi et al. |
| 2004/0098358 | A1 | 5/2004 | Roediger |
| 2005/0108652 | A1 | 5/2005 | Beretich, Jr. et al. |
| 2005/0155043 | A1 | 7/2005 | Schulz et al. |
| 2005/0187643 | A1 | 8/2005 | Sayyar-Rodsari et al. |
| 2006/0095855 | A1 | 5/2006 | Britt et al. |
| 2006/0161597 | A1 | 7/2006 | Ougarov et al. |
| 2007/0094181 | A1 | 4/2007 | Tayebnejab et al. |
| 2007/0124166 | A1 | 5/2007 | Van Luchene |
| 2007/0208549 | A1 | 9/2007 | Blevins et al. |
| 2007/0288256 | A1 | 12/2007 | Speier |
| 2008/0077512 | A1 | 3/2008 | Grewal |
| 2008/0082186 | A1 | 4/2008 | Hood et al. |
| 2008/0082297 | A1 | 4/2008 | Lundeberg et al. |
| 2008/0114474 | A1 | 5/2008 | Campbell et al. |
| 2008/0154848 | A1 | 6/2008 | Haslam et al. |
| 2008/0195604 | A1 | 8/2008 | Sears |
| 2009/0012827 | A1 | 1/2009 | Avrunin |
| 2009/0063427 | A1 | 3/2009 | Zuta et al. |
| 2009/0088883 | A1 * | 4/2009 | Baier ..................... G06T 7/001 700/110 |
| 2009/0089032 | A1 | 4/2009 | Sturrock et al. |
| 2009/0228176 | A1 | 9/2009 | Mintah et al. |
| 2009/0282067 | A1 | 11/2009 | Bendigeri et al. |
| 2010/0031199 | A1 | 2/2010 | Birzer et al. |
| 2010/0050097 | A1 | 2/2010 | Mcgreevy et al. |
| 2010/0292825 | A1 | 11/2010 | Taylor et al. |
| 2011/0040531 | A1 | 2/2011 | Stolper |
| 2011/0138338 | A1 | 6/2011 | Glasgow |
| 2011/0261049 | A1 | 10/2011 | Cardno et al. |
| 2012/0022849 | A1 | 1/2012 | Wang et al. |
| 2012/0054650 | A1 | 3/2012 | Bliss et al. |
| 2012/0078432 | A1 | 3/2012 | Weatherhead et al. |
| 2012/0116743 | A1 | 5/2012 | Ayala et al. |
| 2012/0296452 | A1 * | 11/2012 | Baier ..................... G06Q 10/06 700/83 |
| 2013/0124465 | A1 | 5/2013 | Pingel et al. |
| 2013/0211555 | A1 | 8/2013 | Lawson et al. |
| 2013/0211870 | A1 | 8/2013 | Lawson et al. |
| 2013/0212129 | A1 | 8/2013 | Lawson et al. |
| 2013/0212420 | A1 | 8/2013 | Lawson et al. |
| 2014/0047107 | A1 | 2/2014 | Maturana et al. |
| 2014/0121789 | A1 | 5/2014 | Brandes et al. |
| 2014/0156710 | A1 | 6/2014 | VanGompel |
| 2014/0180644 | A1 | 6/2014 | Maturana et al. |
| 2014/0222522 | A1 | 8/2014 | Chait |
| 2014/0226460 | A1 | 8/2014 | Kretschmann et al. |
| 2014/0278312 | A1 | 9/2014 | Nixon et al. |
| 2014/0297244 | A1 | 10/2014 | Maturana et al. |
| 2014/0335480 | A1 | 11/2014 | Asenjo et al. |
| 2014/0336785 | A1 | 11/2014 | Asenjo et al. |
| 2014/0336786 | A1 | 11/2014 | Asenjo et al. |
| 2014/0337000 | A1 | 11/2014 | Asenjo et al. |
| 2014/0337086 | A1 | 11/2014 | Asenjo et al. |
| 2014/0337429 | A1 | 11/2014 | Asenjo et al. |
| 2015/0064802 | A1 | 3/2015 | Pollack et al. |
| 2015/0120009 | A1 | 4/2015 | Kilian |
| 2015/0134400 | A1 | 5/2015 | Kashi |
| 2015/0134733 | A1 * | 5/2015 | Maturana ................ H04L 67/12 709/203 |
| 2015/0199224 | A1 | 7/2015 | Mihnev |
| 2015/0261200 | A1 | 9/2015 | Blevins et al. |
| 2015/0277404 | A1 | 10/2015 | Maturana et al. |
| 2015/0277406 | A1 | 10/2015 | Maturana et al. |
| 2015/0281319 | A1 | 10/2015 | Maturana et al. |
| 2015/0281355 | A1 | 10/2015 | Maturana et al. |
| 2015/0281356 | A1 | 10/2015 | Maturana et al. |
| 2015/0281453 | A1 | 10/2015 | Maturana et al. |
| 2015/0284810 | A1 * | 10/2015 | Knight ..................... E21B 43/16 702/22 |
| 2015/0316904 | A1 | 11/2015 | Govindaraj et al. |
| 2015/0365492 | A1 | 12/2015 | Kalan et al. |
| 2016/0087933 | A1 | 3/2016 | Johnson et al. |
| 2016/0132595 | A1 | 3/2016 | Bliss et al. |
| 2016/0112283 | A1 | 4/2016 | Maturana et al. |
| 2016/0179599 | A1 | 6/2016 | Deshpande et al. |
| 2016/0234186 | A1 | 8/2016 | Leblond et al. |
| 2016/0274553 | A1 | 9/2016 | Strohmenger et al. |
| 2016/0274558 | A1 | 9/2016 | Strohmenger et al. |
| 2016/0299999 | A1 | 10/2016 | James et al. |
| 2016/0330291 | A1 | 11/2016 | Asenjo et al. |
| 2017/0017903 | A1 | 1/2017 | Gray et al. |
| 2017/0102678 | A1 | 4/2017 | Nixon et al. |
| 2017/0102694 | A1 | 4/2017 | Enver et al. |
| 2017/0126843 | A1 | 5/2017 | Pantea et al. |
| 2017/0192414 | A1 | 7/2017 | Mukkamala et al. |
| 2017/0208151 | A1 | 7/2017 | Gil et al. |
| 2017/0236067 | A1 | 8/2017 | Tjiong |
| 2017/0249129 | A1 | 8/2017 | McDaniel |
| 2017/0261969 | A1 | 9/2017 | Peake et al. |
| 2017/0323403 | A1 | 11/2017 | Johnson et al. |
| 2017/0337226 | A1 | 11/2017 | Bliss et al. |
| 2017/0351226 | A1 | 12/2017 | Bliss et al. |
| 2017/0351241 | A1 | 12/2017 | Bowers et al. |
| 2017/0357250 | A1 | 12/2017 | Sandler et al. |
| 2018/0054376 | A1 | 2/2018 | Hershey et al. |
| 2018/0074477 | A1 | 3/2018 | Burkhard et al. |
| 2018/0074478 | A1 | 3/2018 | Burkhard et al. |
| 2018/0076069 | A1 | 3/2018 | Burkhard et al. |
| 2018/0188704 | A1 | 7/2018 | Celia et al. |
| 2018/0210436 | A1 | 7/2018 | Burd et al. |
| 2018/0284758 | A1 | 10/2018 | Celia et al. |
| 2018/0285234 | A1 | 10/2018 | Degaonkar et al. |
| 2018/0300437 | A1 | 10/2018 | Thomsen et al. |
| 2018/0356800 | A1 | 12/2018 | Chao et al. |
| 2018/0357334 | A1 | 12/2018 | Chao et al. |
| 2018/0357823 | A1 | 12/2018 | Koniki et al. |
| 2019/0014180 | A1 | 1/2019 | Lawson et al. |

(56) References Cited

U.S. PATENT DOCUMENTS

| | | | |
|---|---|---|---|
| 2019/0041845 | A1 | 2/2019 | Celia et al. |
| 2019/0042987 | A1 | 2/2019 | Heubach et al. |
| 2019/0062062 | A1 | 2/2019 | King et al. |
| 2019/0078950 | A1 | 3/2019 | Huang et al. |
| 2019/0086902 | A1 | 3/2019 | Ganachari |
| 2019/0087900 | A1 | 3/2019 | Crowley et al. |
| 2019/0121340 | A1 | 4/2019 | Celia et al. |
| 2019/0188192 | A1 | 6/2019 | Hayes et al. |
| 2019/0393813 | A1 | 12/2019 | Huang et al. |
| 2020/0005094 | A1 | 1/2020 | Sinha et al. |
| 2020/0050181 | A1 | 2/2020 | McDaniel |
| 2020/0151479 | A1 | 5/2020 | Cordell et al. |
| 2021/0397171 | A1 | 12/2021 | Sayyarrodsari et al. |

FOREIGN PATENT DOCUMENTS

| | | |
|---|---|---|
| CN | 104950837 A | 9/2015 |
| CN | 105589349 A | 5/2016 |
| CN | 108491626 A | 9/2018 |
| CN | 108713205 A | 10/2018 |
| EP | 1638028 A2 | 3/2006 |
| EP | 2 592 812 A2 | 5/2013 |
| EP | 2 595 112 A1 | 5/2013 |
| EP | 2728427 A1 | 5/2014 |
| EP | 2 801 935 A1 | 11/2014 |
| EP | 3 018 596 A1 | 5/2016 |
| EP | 3 070 547 A2 | 9/2016 |
| EP | 3 255 590 A1 | 12/2017 |
| EP | 3 410 245 A1 | 12/2018 |
| EP | 3 726 320 A1 | 10/2020 |
| WO | 01/69329 A3 | 9/2001 |
| WO | 2016054110 A1 | 4/2016 |
| WO | 2018/144897 A1 | 9/2018 |
| WO | 2018/183275 A1 | 10/2018 |

OTHER PUBLICATIONS

Basile, Francesco, Pasquale Chiacchio, and Diego Gerbasio. "On the implementation of industrial automation systems based on PLC." IEEE Transactions on Automation Science and Engineering 10.4 (2012): pp. 990-1003. (Year: 2012).*
O'brien, K., G. Scheible, and H. Gueldner. "Analysis of wireless power supplies for industrial automation systems." IECON'03. 29th Annual Conference of the IEEE Industrial Electronics Society (IEEE Cat. No. 03CH37468). vol. 1. IEEE, 2003.pp.367-372 (Year: 2003).*
Non-Final Office Action received for U.S. Appl. No. 16/384,106 dated Dec. 15, 2020, 97 pages.
Leitao, et al. "Integration Patterns for Interfacing Software Agents with Industrial Automation Systems", IEEE 2018 #978-1-5090-6684-1/18, 2018, pp. 2908-2913.
European Search Report received for EP Patent Application Serial No. 17175165.4 dated Aug. 10, 2017, 9 pages.
European Search Report received for EP Patent Application Serial No. 17175166.2 dated Aug. 14, 2017, 9 pages.
Feddersen, Charles., "Real-Time Event Processing with Microsoft Azure Stream Analytics", Reference Architecture, Jan. 2015, 31 pages.
Non-Final Office Action received for U.S. Appl. No. 15/609,301 dated Dec. 13, 2018, 35 pages.
Non-Final Office Action received for U.S. Appl. No. 15/609,323 dated Dec. 31, 2018, 34 pages.
Communication pursuant to Article 94(3) received for EP Patent Application Serial No. 17175165.4 dated Jan. 18, 2019, 8 pages.
Communication pursuant to Article 94(3) received for EP Patent Application Serial No. 17175166.2 dated Dec. 20, 2018, 10 pages.
Non-Final Office Action received for U.S. Appl. No. 15/489,091 dated Feb. 25, 2019, 26 pages.
Final Office Action received for U.S. Appl. No. 15/609,301 dated May 22, 2019, 35 pages.
Final Office Action received for U.S. Appl. No. 15/609,323 dated May 23, 2019, 32 pages.
Non-Final Office Action received for U.S. Appl. No. 15/609,301 dated Sep. 3, 2019, 35 pages.
Notice of Allowance received for U.S. Appl. No. 15/609,323 dated Aug. 12, 2019, 37 pages.
Non-Final Office Action received for U.S. Appl. No. 15/936,870 dated Jul. 10, 2019, 51 pages.
Non-Final Office Action received for U.S. Appl. No. 15/936,940 dated Sep. 9, 2019, 65 pages.
First Office Action received for Chinese Patent Application Serial No. 201710432617.4 dated Jun. 20, 2019, 20 pages Including English Translation).
First Office Action received for Chinese Patent Application Serial No. 201710433517.3 dated Jun. 21, 2019, 19 pages Including English Translation).
Notice of Allowance received for U.S. Appl. No. 15/609,301 dated Nov. 21, 2019, 43 pages.
Summons to attend oral proceedings pursuant to Rule 115(1) EPC received for EP Patent Application Serial No. 17175165.4 dated Nov. 21, 2019, 32 pages.
Wikipedia, "Modularity", URL: https://en.wikipedia.org/w/index.php?title=Modularity&oldid=714646548, Apr. 11, 2016, pp. 1-10.
Wikipedia, "Modular design", URL: https://en.wikipedia.org/w/index.php?title=Modular_design&oldid=721647382, May 23, 2016, pp. 1-4.
Wikipedia, "Modular programming", URL: https://en.wikipedia.org/w/index.php?title=Modular_programming&oldid=723013178, May 31, 2016, pp. 1-5.
Final Office Action received for U.S. Appl. No. 15/936,940 dated Jan. 14, 2020, 43 pages.
Second Office Action received for Chinese Patent Application Serial No. 201710432617.4 dated Jan. 15, 2020, 24 pages (Including English Translation).
Second Office Action received for Chinese Patent Application Serial No. 201710433517.3 dated Feb. 3, 2020, 23 pages (Including English Translation).
Non-Final Office Action received for U.S. Appl. No. 15/936,835 dated Apr. 9, 2020, 79 pages.
Non-Final Office Action received for U.S. Appl. No. 15/936,940 dated Apr. 16, 2020, 40 pages.
Notification of Grant of Patent for Invention received for Chinese Patent Application Serial No. 201710432617 dated Jul. 28, 2020, 08 pages.
Non-Final Office Action received for U.S. Patent Application Serial No. 16/677,088 dated Aug. 6, 2020, 50 pages.
Final Office Action received for U.S. Appl. No. 15/936,940 dated Aug. 21, 2020, 48 pages.
Communication pursuant to Rule 69 EPC received for EP Patent Application Serial No. 20157116.3 dated Aug. 24, 2020, 2 pages.
European Search Report received for EP Patent Application Serial No. 20157116.3 dated Jul. 15, 2020, 8 pages.
Final Office Action received for U.S. Appl. No. 16/677,088 dated Nov. 20, 2020, 38 pages.
Non-Final Office Action received for U.S. Appl. No. 16/677,088 dated Mar. 1, 2021, 36 pages.
Non-Final Office Action received for U.S. Appl. No. 16/030,257 dated Feb. 11, 2021, 148 pages.
Popovics et al., "Automatic simulation model generation based on PLC codes and MES stored data," 2012, 45th CIRPConference on Manufacturing Systems, 2012, 6 pages.
Schroeder et al., "Visualizing the digital twin using web services and augmented reality," 2016 IEEE 14th International Conference on Industrial Informatics, 2016, pp. 522-527.
MMLITE., "MagneMover LITE User Manual", 382 pages.
European Search Report received for EP Patent Application Serial No. 20169524.4 dated Aug. 19, 2020, 9 pages.
Communication pursuant to Rule 69 EPC for EP Patent Application Serial No. 20169524.4 dated Oct. 26, 2020, 2 pages.
Non-Final Office Action received for U.S. Appl. No. 15/936,940 dated Mar. 23, 2021, 48 pages.
Notice of Allowance received for U.S. Appl. No. 16/030,257 dated May 27, 2021, 36 pages.

(56) References Cited

OTHER PUBLICATIONS

Extended European Search Report received for European Patent Application Serial No. 20166639.3 dated Mar. 2, 2021, 09 pages.
Extended European Search Report received for European Patent Application Serial No. 20166935.5 dated Feb. 22, 2021, 09 pages.
Extended European Search Report received for European Patent Application Serial No. 20166933.0 dated Mar. 1, 2021, 07 pages.
Communication pursuant to Rule 69 EPC received for European Patent Application Serial No. 20166639.3 dated Apr. 37,2021, 2 pages.
Communication pursuant to Rule 69 EPC received for European Patent Application Serial No. 20166933.0 dated Apr. 37, 2021, 2 pages.
Communication pursuant to Rule 69 EPC received for European Patent Application Serial No. 20166935.5 dated Apr. 37,2021, 2 pages.
Final Office Action received for U.S. Appl. No. 16/677,088 dated Jun. 9, 2021, 55 pages.
Final Office Action received for U.S. Appl. No. 16/587,187 dated Sep. 21, 2022, 42 pages.
Final Office Action received for U.S. Appl. No. 16/907,464 dated Oct. 27, 2022, 66 pages.
Non Final Office Action received for U.S. Appl. No. 16/985,769 dated Nov. 8, 2022, 94 pages.
Notification to Grant Patent Right for Invention received for Chinese Patent Application Serial No. CN202010285139.0 dated Jun. 1, 2022, 3 pages (Including English Translation).
Non-Final Office Action received for U.S. Appl. No. 16/588,118 dated Jun. 28, 2021, 89 pages.
Zhang et al., "A big data analytics architecture for cleaner manufacturing and maintenance processes of complex products", Elsevier Journal of Cleaner Production, 2017, pp. 625-641.
Extended European Search report received for European application No. 20216463.8 dated Jun. 4, 2021, 9 pages.
Communication pursuant to Rule 69 EPC received for European application No. 20216463.8 dated Jul. 12, 2021, 2 pages.
Non-Final Office Action received for U.S. Appl. No. 16/734,714 dated Jun. 18, 2021, 89 pages.
Non-Final Office Action received for U.S. Appl. No. 16/807,288 dated Aug. 17, 2021, 107 pages.
Final Office Action received for U.S. Appl. No. 16/734,714 dated Aug. 20, 2021, 28 pages.
Final Office Action received for U.S. Appl. No. 16/588,118 dated Oct. 8, 2021, 80 pages.
Non-Final Office Action received for U.S. Appl. No. 16/905,130 dated Sep. 30, 2021, 99 pages.
European Search Report received for EP Patent Application Serial No. 21175265.4 dated Nov. 11, 2021, 9 pages.
Non-Final Office Action received for U.S. Appl. No. 16/587,187 dated Dec. 22, 2021, 58 pages.
Search Report received for Chinese Patent Application Serial No. 2020102851390 dated Dec. 9, 2021, 2 pages.
Extended European Search report received for European Application No. 21178010.1 dated Nov. 17, 2021, 11 pages.
Communication pursuant to Rule 69 EPC received for European application No. 21178010.1 dated Jan. 4, 2022, 2 pages.
Extended European Search report received for European Application No. 21178229.7 dated Dec. 1, 2021, 11 pages.
Communication pursuant to Rule 69 EPC received for European application No. 21175265.4 dated Feb. 14, 2022, 2 pages.
Extended European Search report received for European Application No. 21175655.6 dated Nov. 4, 2021, 08 pages.
Communication pursuant to Rule 69 EPC received for European application No. 21175655.6 dated Jan. 31, 2022, 2 pages.
Notice of Allowance received for U.S. Appl. No. 16/807,288 dated Feb. 18, 2022, 130 pages.
Notice of Allowance received for U.S. Appl. No. 16/276,108 dated Mar. 1, 2022, 97 pages.

First Office Action received for Chinese Patent Application Serial No. 202010285139.0 dated Dec. 17, 2021, 07 pages (Including English Translation).
Communication pursuant to Rule 69 EPC for EP Patent Application Serial No. 20169524.4 dated Feb. 14, 2022, 8 pages.
Non-Final Office Action received for U.S. Appl. No. 16/587,214 dated Mar. 2, 2022, 105 pages.
Gungor et al., "Industrial wireless sensor networks: Challenges, design principles, and technical approaches", IEEE Transactions on Industrial Electronics, vol. 56, No. 10, 2009, pp. 4258-4265.
Akerberg et al., "Future research challenges in wireless sensor and actuator networks targeting industrial automation", 2011 9th IEEE International Conference on Industrial Informatics, IEEE, 2011, pp. 410-415.
Dekker, R., "Applications of maintenance optimization models: a review and analysis", Reliability Engineering & System Safety, vol. 51, No. 3, 1996, pp. 229-240.
Non-Final Office Action received for U.S. Appl. No. 16/588,118 dated Mar. 28, 2022, 80 pages.
Jun et al.,"Cloud-based big data analytics platform using algorithm templates for the manufacturing industry," International Journal of Computer Integrated Manufacturing, vol. 32, No. 8, Aug. 1, 2019, pp. 723-738.
Final Office Action received for U.S. Appl. No. 16/905,130 dated Apr. 6, 2022, 126 pages.
Communication pursuant to Rule 94(3) EPC for EP Patent Application Serial No. 20166639.3 dated Mar. 2, 2022, 5 pages.
Communication pursuant to Rule 94(3) EPC for EP Patent Application Serial No. 20157116.3 dated Mar. 16, 2022, 9 pages.
Notice of Allowance received for U.S. Appl. No. 16/587,214 dated Apr. 28, 2022, 50 pages.
Cowie et al., "Information extraction", Communications of the ACM, vol. 39, No. 1, 1996, pp. 80-91.
Vyatkin et al., "Software engineering in industrial automation: State-of-the-art-review", IEEE Transactions on Industrial Informatics, vol. 9, No. 3, 2013, pp. 1234-1249.
Magesh et al., "A GIS based automated extraction tool for the analysis of basin morphometry", Bonfring International Journal of Industrial Engineering and Management Science, vol. 2, 2012, pp. 32-35.
Non-Final Office Action received for U.S. Appl. No. 16/587,187 dated Apr. 27, 2022, 42 pages.
Final Office Action received for U.S. Appl. No. 16/588,118 dated Jun. 29, 2022, 124 pages.
Non-Final Office Action received for U.S. Appl. No. 16/905,130 dated Jun. 22, 2022, 156 pages.
Non-Final Office Action received for U.S. Appl. No. 16/907,464 dated Jun. 2, 2022, 117 pages.
Communication pursuant to Rule 94(3) EPC for EP Patent Application Serial No. 20166935.5 dated Jun. 17, 2022, 6 pages.
Communication pursuant to Article 94(3) EPC for EP Patent Application Serial No. 21178010.1 dated Jul. 28, 2022, 6 pages.
Non Final Office Action received for U.S. Appl. No. 17/557,423 dated Dec. 8, 2022, 54 pages.
Non Final Office Action received for U.S. Appl. No. 17/033,180 dated Dec. 12, 2022, 110 pages.
Communication pursuant to Article 94(3) received for EP Patent Application Serial No. 20166639.3 dated Dec. 7, 2022, 9 pages.
Communication pursuant to Article 94(3) received for EP Patent Application Serial No. 21178010.1 dated Dec. 5, 2022, 4 pages.
Notice of Allowance received for U.S. Appl. No. 16/905,130 dated Mar. 27, 2023, 9 pages.
Non-Final Office Action received for U.S. Appl. No. 16/907,464 dated Feb. 6, 2023, 66 pages.
Final Office Action received for U.S. Appl. No. 17/033,180 dated Apr. 6, 2023, 69 pages.
Non-Final Office Action received for U.S. Appl. No. 17/377,942 dated Mar. 6, 2023, 118 pages.

* cited by examiner

| | | | New AI Properties | | |
|---|---|---|---|---|---|
| <TAG 1> | STATE | VALUE | METADATA | AI FIELDS | |
| <TAG 2> | STATE | VALUE | METADATA | AI FIELDS | |
| <TAG 3> | RATE | VALUE | METADATA | AI FIELDS | |
| <TAG 4> | EVENT | VALUE | METADATA | AI FIELDS | |
| <TAG 5> | ODOMETER | VALUE | METADATA | AI FIELDS | 904 |

CONTEXTUALIZATION OF INDUSTRIAL DATA AT THE DEVICE LEVEL

CROSS-REFERENCE TO RELATED APPLICATIONS

This application is a continuation of, and claims priority to, U.S. patent application Ser. No. 16/587,214, filed on Sep. 30, 2019, and entitled "CONTEXTUALIZATION OF INDUSTRIAL DATA AT THE DEVICE LEVEL," the entirety of which is incorporated herein by reference.

BACKGROUND

The subject matter disclosed herein relates generally to industrial automation systems, and, for example, to application of analytics to extract business value from industrial data

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, an industrial device is provided, comprising a program execution component configured to execute an industrial control program, wherein the industrial control program reads data values from and writes data values to data tags stored on the memory, and at least a subset of the data tags comprise smart tags having associated contextualization metadata; a smart tag configuration component configured to set the contextualization metadata associated with the smart tags, wherein the contextualization metadata defines correlations between the smart tags relevant to a defined business objective to yield a device-level data model; and a data publishing component configured to send data values and the contextualization metadata corresponding to the smart tags to an external system.

Also, one or more embodiments provide a method, comprising executing, by an industrial device comprising a processor, an industrial control program, wherein the industrial control program reads data values from and writes data values to data tags stored in a memory, and wherein at least a subset of the data tags comprise smart tags having associated contextualization metadata; setting, by the industrial device, the contextualization metadata associated with the smart tags, wherein the contextualization metadata defines correlations between the smart tags relevant to a defined business objective to yield a device-level data model; and sending, by the industrial device, data values and the contextualization metadata corresponding to the smart tags to an external system.

Also, according to one or more embodiments, a non-transitory computer-readable medium is provided having stored thereon instructions that, in response to execution, cause an industrial device comprising a processor to perform operations, the operations comprising executing an industrial control program, wherein the industrial control program reads data values from and writes data values to data tags stored in a memory, and wherein at least a subset of the data tags comprise smart tags having associated contextualization metadata; setting the contextualization metadata associated with the smart tags, wherein the contextualization metadata defines correlations between the smart tags relevant to a defined analytic objective to yield a device-level data model; and sending data values and the contextualization metadata corresponding to the smart tags to an external system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is an example data schema depicting items of smart data that have been augmented by a data modeling component to include AI fields defining various AI properties.

DETAILED DESCRIPTION

Figure 1:
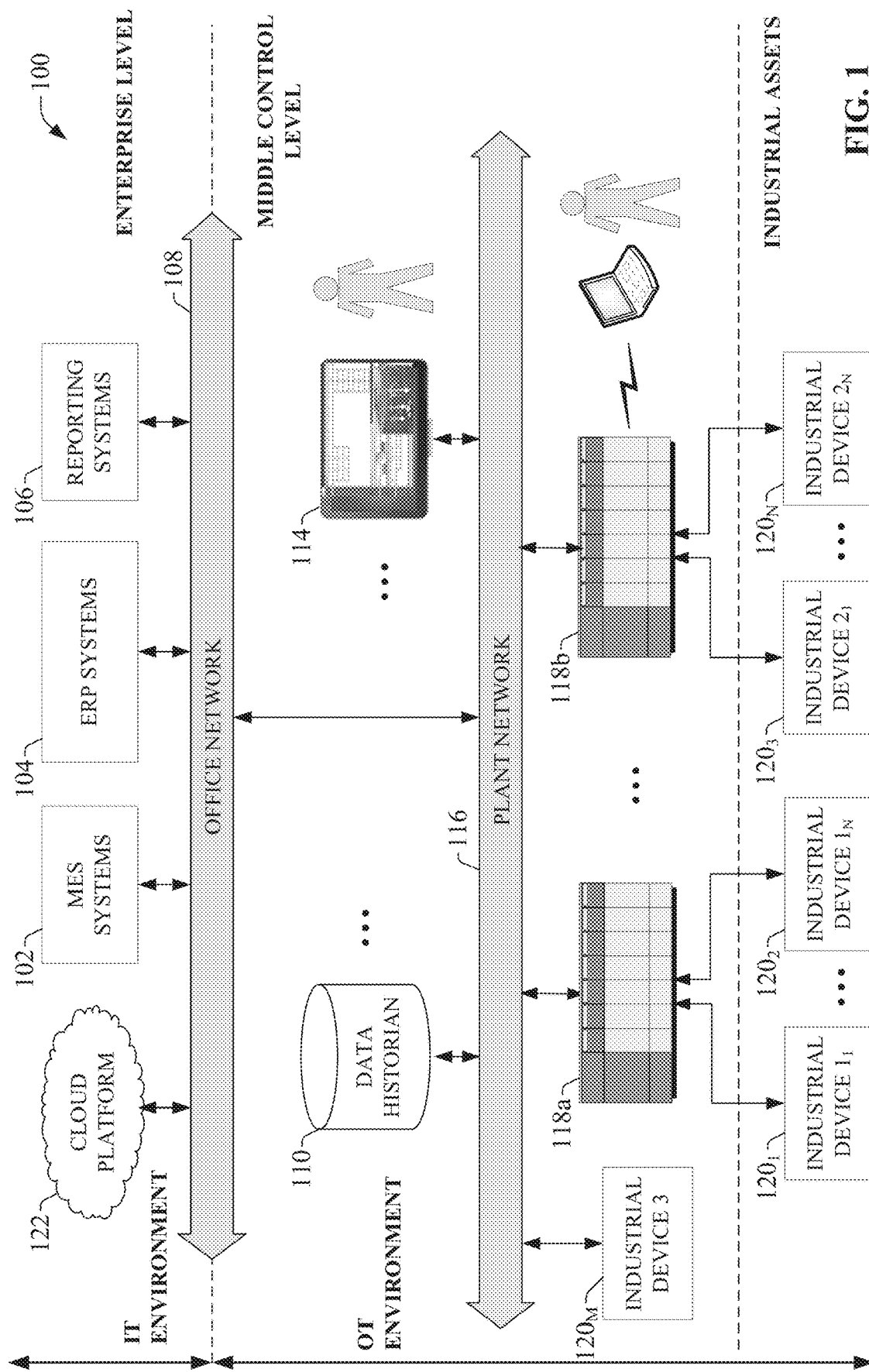
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers, including cloud-based computing systems. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, C++, Python, Javascript, or other such platforms.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer, on a server blade, or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. Such higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level given higher-level business considerations. Reporting systems 106 can collect operational data from industrial devices on the plant floor and generate daily or shift reports that summarize operational statistics of the controlled industrial assets.

A given industrial enterprise can comprise many of these industrial assets, which generate large amounts of information during plant operation. With the advent of big data storage and analytic approaches, it becomes possible to continually stream data from these disparate industrial data sources to big data storage (e.g., a data lake) and transform these large and disparate sets of data into actionable insights into controlled industrial processes and machines. Artificial intelligence (AI) and machine learning hold great promise for extracting insights from industrial big data. These analytic approaches can discover patterns in data that can be leveraged to predict machine failures and identify other useful correlations between industrial data. As a plant's equipment ages, discovery of new correlations between data can provide valuable new insights. For example, AI analytics applied to industrial big data can discover that wear of a pump's bearing is likely to change the vibration of the pump. The insights gleaned from such big data analysis can lead to increased productivity, optimized production, and new business value.

Figure 2A:
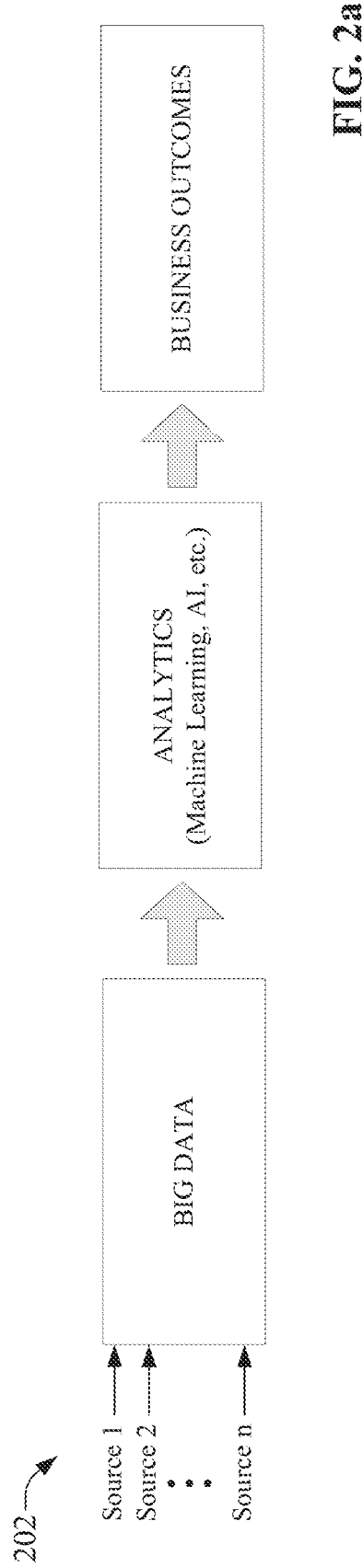
FIG. 2a is a flow diagram illustrating a typical big data analysis approach.

FIG. 2a is a flow diagram illustrating a typical big data analysis approach. According to this approach, data from multiple industrial data sources 202 is streamed to big data storage (e.g., a data lake or database). High-level analytics—such as AI, machine learning, statistical analysis, or another data science approach—are applied to these large and disparate sets of data until useful correlations and actionable insights are discovered. These actionable insights may be in the form of business outcomes, recommendations for minimizing or predicting machine downtime events, recommendations for minimizing energy utilization, recommendations for maximizing product throughput, or other such business goals. Big data analytics can yield insights into these desired business outcomes by discovering correlations between machines, devices, plant-floor events, sensor inputs, and other measurable factors represented by the aggregated sets of big data.

Although data streams from industrial data sources can be used to amass very large sets of data to which analytics (e.g., AI, machine learning, data science, etc.) can be applied, the time to derive value from these large data sets, and the costs associated with storing and processing industrial big data, can be significant. This is because the data generated by industrial devices and other industrial data sources is typically unstructured and initially uncorrelated. Consequently, intelligent analytics must spend a considerable amount of processing time learning correlations and causalities between these sets of unstructured industrial data. This approach also requires considerable data storage capacity given the large amounts of data generated by the industrial enterprise. For example, an oil and gas company is likely to generate large amounts of data from compressors alone, which can produce 500 gigabytes of data per day in some cases, yielding data volumes in excess of a petabyte in one year. Thus, although the approach illustrated in FIG. 2a can lead to discovery of new insights from learned correlations between large data sets, this approach can also produce relatively few insights relative to the large amount of data being stored and processed.

Also, although the analytic approach illustrated in FIG. 2a can identify valid and useful correlations between data sets, big data analytic systems may also identify spurious, misleading, or unhelpful correlations between data sets. Humans are therefore ultimately required to determine whether a correlation learned by the analytic system is valid, and why this relationship exists. Applying this human expertise to analytic results at the back end of the analytic process, by submitting results produced by the AI analytics to an industry expert for review or verification, can result in a considerable amount of analytic processing and data storage wasted on producing spurious results.

To address these and other issues, one or more embodiments described herein provide a smart gateway platform that leverages industrial expertise to identify limited subsets of available industrial data deemed relevant to a desired business objective. This approach can reduce the data space to which AI analytics are applied, and provides useful constraints on the AI analytics, in the form of pre-defined correlations and causalities between the data, that assist data analytic systems to more quickly derive valuable insights and business outcomes. In some embodiments, the smart gateway platform can operate within the context of a multi-level industrial analytic system, feeding pre-modeled data to one or more analytic systems (e.g., AI, machine learning, or statistical analysis systems) executing on one or more different levels of an industrial enterprise.

In a related aspect, one or more embodiments also provide tools at the device level, the gateway level, and/or the cloud level that allow users to subscribe to data subsets of interest using an industrial publish-subscribe approach. These tools can include smart tag support at the industrial device level that allows selected data items (e.g., smart tags, automation objects representing industrial assets that serve as building blocks for control programming, etc.) to be labeled according to analytic or business topics to which the data items relate (e.g., Quality, Energy Consumption, Product Throughput, Machine Runtime, etc.). These labeled data sets can be streamed from the lower device levels to higher broker or analytic levels, and users or high-level analytics systems can subscribe to selected data streams of interest according to the label associated with the data streams. In the case of structured data, such as smart tags or automation objects, the associated data streams include any contextualization or metadata associated with those tags/objects. In this way, device-level data models provide a means to feed selected sets of structured industrial data to analytic systems (e.g., industrial AI systems).

Figure 2B:
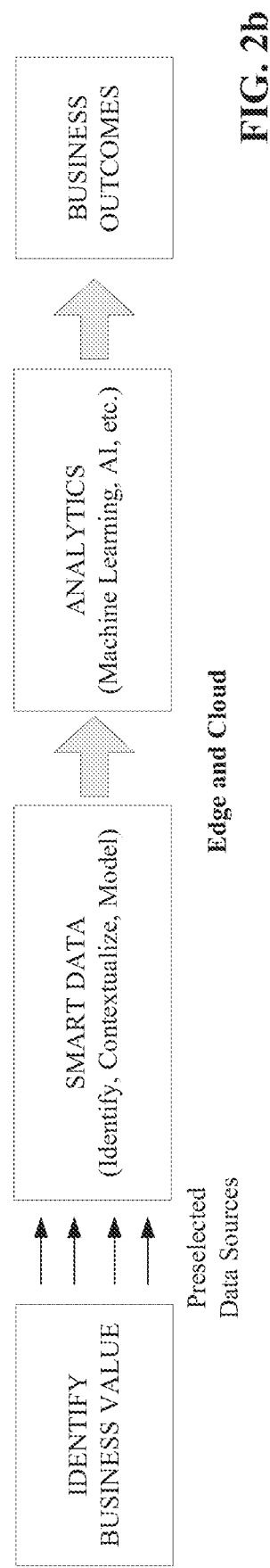
FIG. 2b is a flow diagram illustrating an analytic approach in which a business value is initially identified and data is selected for streaming based on the business value.

Industrial processes such as pumping, packaging, sorting, filling, distillation, and brewing follow patterns of behavior that are, to a degree, predictable and understood by system designers and operators. People who have knowledge of specific sets of industrial machines and processes are known as domain experts. One or more embodiments of the industrial analytic system described herein leverage this domain expertise to aggregate and model selected sets of industrial data as a function of the business output desired from the analytics, then feed this modeled industrial data to higher-level analytic systems for storage and AI analysis. FIG. 2b is a flow diagram illustrating this general analytic approach. Rather than collecting, storing, and analyzing all raw data available from an industrial enterprise (or unnecessarily large sets of this available data), as in the approach depicted in FIG. 2a, this approach begins with identification of the business value or outcome desired—e.g., minimize downtime of a certain type of industrial machine, maximize product output, optimize energy efficiency, improve product quality, reduce emissions, etc. —and leverages domain experts' knowledge of causality in industrial systems to select data sets relevant to the desired business outcome, and to contextualize and model the data in a manner that drives the desired business outcome. The system then matches and applies appropriate analytics and data processing solutions to the modeled data. This approach can dramatically reduce the time-to-value of industrial data analytics relative to sifting through large sets of uncorrelated and unstructured industrial data (as in conventional big data analytics approaches). Since the encoded domain expertise specifies the subset of available plant data known to be relevant to the desired business objective, the system can reference this expertise to select and stream only the data items known to be relevant to the problem or business objective to be solved, reducing the amount of data storage required for industrial data analysis.

According to the approach depicted in FIG. 2b, the starting point for application of industrial machine learning and AI is identification of the business problem to be solved. Relevant smart data (also referred to as contextualized data) or raw data from one or more industrial data sources is then selected to match desired business outcomes based on defined domain expertise, and the smart data is contextualized and modeled. In some embodiments, the data may be modeled according to object-oriented models. In the case of scalable analytic environments, analytics can be applied to the contextualized and modeled smart data at the level of the industrial enterprise to which the business outcome is most relevant. For example, analysis and actions that relate to real-time operation of industrial machines can be implemented on an edge device (e.g., a network infrastructure device that communicatively links the plant network to external networks or systems) and acted upon at the machine level, without the involvement of a higher-level system to determine the necessary control actions.

Figure 3:
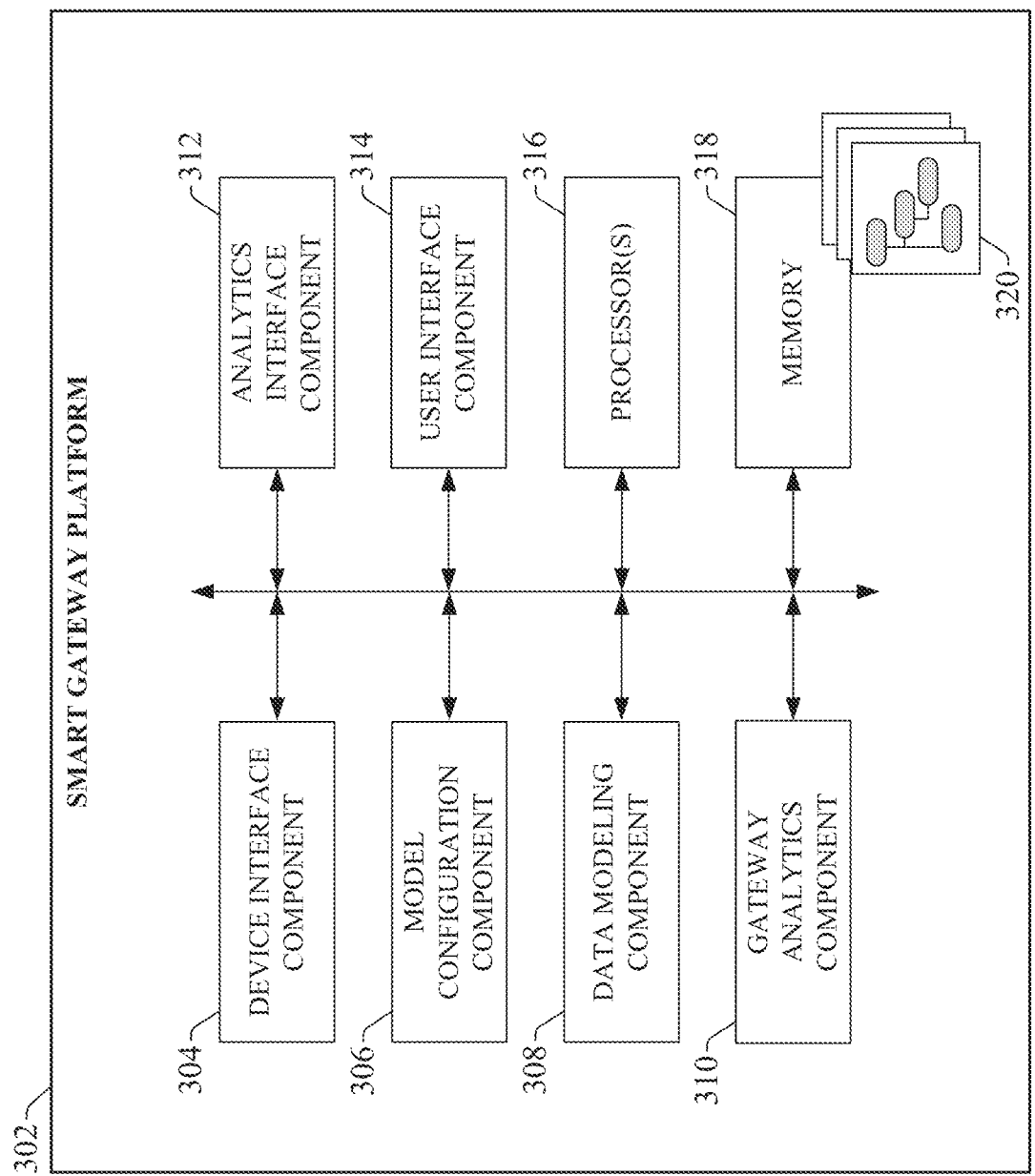
FIG. 3 is a block diagram of an example smart gateway platform.

FIG. 3 is a block diagram of an example smart gateway platform 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine (s), etc., can cause the machine(s) to perform the operations described.

Smart gateway platform 302 can include a device interface component 304, a model configuration component 306, a data modeling component 308, a gateway analytics component 310, an analytics interface component 312, a user interface component 314, one or more processors 316, and memory 318. In various embodiments, one or more of the device interface component 304, model configuration component 306, data modeling component 308, gateway analytics component 310, analytics interface component 312, user interface component 314, the one or more processors 316, and memory 318 can be electrically and/or communicatively coupled to one another to perform one or more of the functions of the smart gateway platform 302. In some embodiments, components 304, 306, 308, 310, 312, and 314 can comprise software instructions stored on memory 318 and executed by processor(s) 316. Smart gateway platform 302 may also interact with other hardware and/or software components not depicted in FIG. 3. For example, processor (s) 316 may interact with one or more external user interface devices, such as a keyboard, a mouse, a display monitor, a touchscreen, or other such interface devices. In some embodiments, smart gateway platform 302 can serve as a logical entity that is embedded in another device, including but not limited to an edge device, an industrial controller, or an HMI terminal.

Device interface component 304 can be configured to exchange information between the smart gateway platform 302 and sources of industrial data at one or more plant facilities. Sources of industrial data that can be accessed by the device interface component 304 can include, but are not limited to, industrial controllers, telemetry devices, motor drives, quality check systems (e.g., vision systems or other quality verification systems), industrial safety systems, cameras or other types of optical sensors, data collection devices (e.g., industrial data historians), or other such information sources. These industrial data sources can comprise devices of different types and vendors, and include sources of both structured and unstructured data. In some embodiments, device interface component 304 can exchange data with these industrial devices via the plant networks on which the devices reside. Device interface component 304 can also receive at least some of the industrial data via a public network such as the Internet in some embodiments. The device interface component 304 can directly access the data generated by these industrial devices and systems via the one or more public and/or private networks in some embodiments. Alternatively, device interface component 304 can access the data on these data sources via a proxy or edge device that aggregates the data from multiple industrial devices for migration to the smart gateway platform 302 via the device interface component 304.

Model configuration component 306 can be configured to generate an analytic model that can be leveraged by an AI or machine learning analytic system in connection with applying suitable analytics for achieving a desired business objective. The analytic model can be generated based on a model template—selected from a library 302 of model templates 502 stored on memory 318— that encodes domain expertise relevant to the business objective. The model template can define data items (e.g., sensor inputs, measured process variables, key performance indicators, machine operating modes, environmental factors, etc.) that are relevant to the business objective, as well as correlations between these data items. Model configuration component 306 can transform this model template to a customized model based on user input that maps the generic data items defined by the model template to actual sources of the data discovered by the device interface component 304.

Data modeling component 308 can be configured to model and contextualize industrial data collected by the device interface component 304 based on relationships defined by the analytic model to yield modeled data that can be fed to a local or external AI analytics system. Data modeling component 308 can model both structured (e.g., smart tags, automation objects, etc.) and unstructured data from a heterogeneous collection of industrial data sources.

Gateway analytics component 310 can be configured to perform local analytics (e.g., AI, machine learning, statistical analysis, etc.) on the modeled industrial data. Analytics interface component 312 can be configured to interface and exchange data with external systems that consume this data to extract business value (e.g., AI systems, machine learning systems, data lakes etc.). This can include sending the modeled industrial data to these external analytic systems or sending results of local analytics performed by the gateway analytics component 310.

User interface component 314 can be configured to exchange information between the smart gateway platform 302 and a client device having authorization to access the platform. In some embodiments, user interface component 314 can be configured to generate and deliver interface displays to the client device that allow the user to specify a business objective to be solved and to customize or edit a model template associated with the specified business objective to map the model template to industrial data sources. User interface component 314 can also deliver analytic results to the client device, including notifications of predicted asset performance issues, recommendations for achieving the specified business objective, or other such analytic outputs.

The one or more processors 316 can perform one or more of the functions described herein with reference to the systems and/or methods disclosed. Memory 318 can be a computer-readable storage medium storing computer-executable instructions and/or information for performing the functions described herein with reference to the systems and/or methods disclosed.

Figure 4:
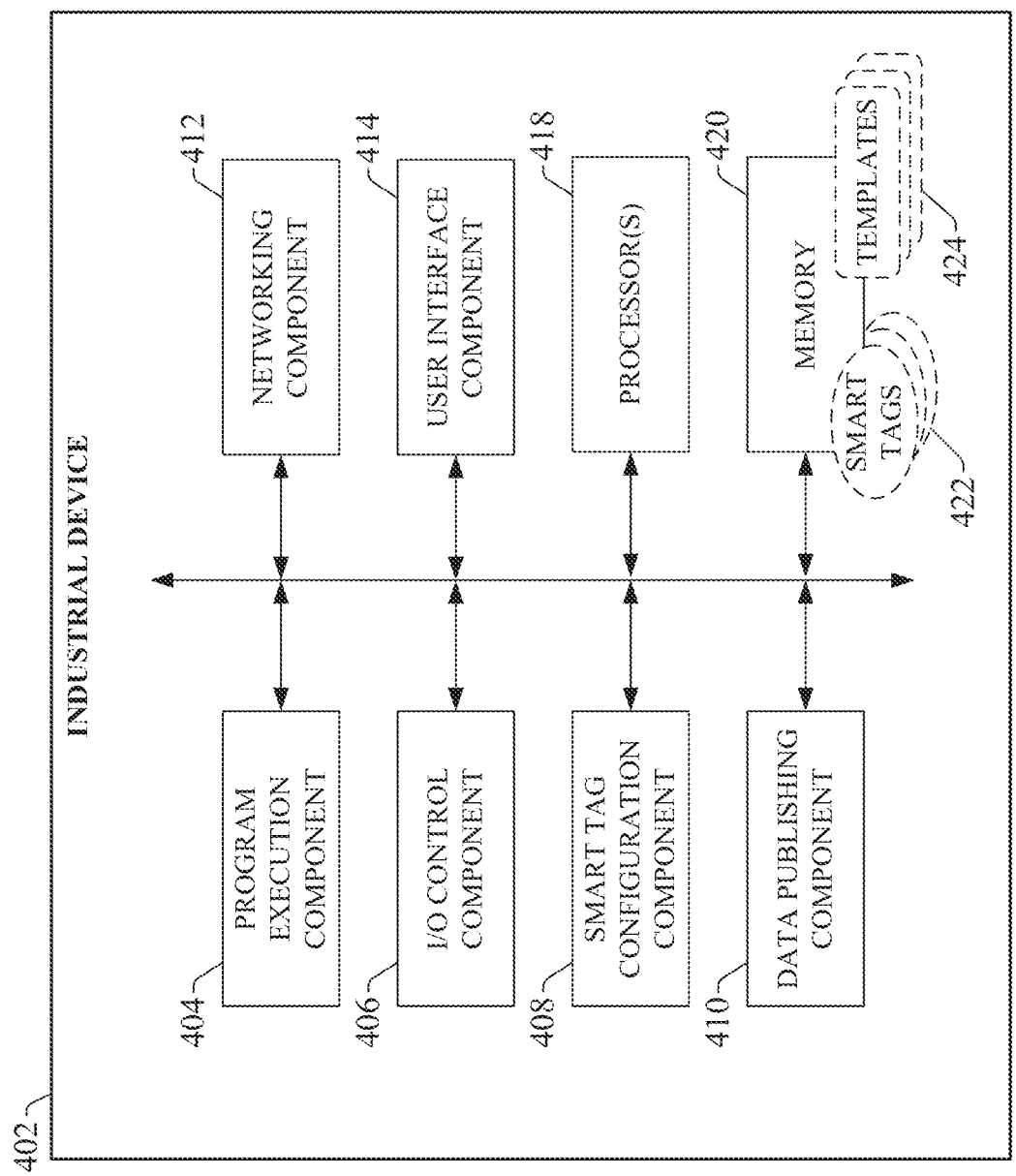
FIG. 4 is a block diagram of an example industrial device that supports smart tag configuration.

FIG. 4 is a block diagram of an example industrial device 402 that supports smart tags and data streaming channels according to one or more embodiments of this disclosure. Industrial device 402 can comprise substantially any type of data-generating industrial device, including but not limited to an industrial controller, a motor drive, an HMI terminal, a vision system, an industrial optical scanner, or other such device or system. Industrial device 402 can include a program execution component 404, an I/O control component 406, a smart tag configuration component 408, a data publishing component 410, a networking component 412, a user interface component 414, one or more processors 418, and memory 420. In various embodiments, one or more of the program execution component 404, I/O control component 406, smart tag configuration component 408, data publishing component 410, networking component 412, user interface component 414, the one or more processors 418, and memory 420 can be electrically and/or communicatively coupled to one another to perform one or more of the functions of the industrial device 402. In some embodiments, components 404, 406, 408, 410, 412, and 414 can comprise software instructions stored on memory 420 and executed by processor(s) 418. Industrial device 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Program execution component 404 can be configured to compile and execute a user-defined control program or executable interpreted code. In various embodiments, the control program can be written in any suitable programming format (e.g., ladder logic, sequential function charts, structured text, C++, Python, Javascript, etc.) and downloaded to the industrial device 402. Typically, the control program uses data values read by the industrial device's analog and digital inputs as input variables, and sets values of the industrial device's analog and digital outputs in accordance with the control program instructions based in part on the input values. I/O control component 406 can be configured to control the electrical output signals of the industrial device's digital and analog electrical outputs in accordance with the control program outputs, and to convert electrical signals on the industrial device's analog and digital inputs to data values that can be processed by the program execution component 404.

Smart tag configuration component 408 can be configured to set metadata values or labels associated with smart tags defined for the industrial device 402 based on metadata configuration input data. As will be described in more detail below, in addition to standard general data types (e.g., real, analog, digital, etc.), industrial device 402 is configured to support smart tags 422 corresponding to industrial-specific data types. Smart tags 422 have associated metadata that can be configured by the user via smart tag configuration component 408 in order to customize the data tags for a given industrial application. Smart tags 422 can also have associated metadata that contextualizes data associated with the tag 422 based on industrial or user expertise in ways that facilitate business-driven analytics, as will be described in more detail herein, effectively pre-modeling the data at the device level. In some embodiments, this data modeling can be defined by vertical-specific or application-specific data modeling templates 424 stored on the device 402, which define key variables as well as relationships and correlations between data items for various business objectives. Templates 424 and smart tags 422 are stored in memory 420 (e.g., in the industrial device's tag database together other defined data tags of other data types).

Data publishing component 410 is configured to expose defined data tags (including smart tags 422) to external systems, allowing the data associated with these tags to be discovered by such systems over a local and/or remote network. In some embodiments, data publishing component 410 can also support data streaming to higher level broker or analytic systems as part of an industrial publish-subscribe architecture, where the resulting data streams serve as data channels to which analytic systems or users can selectively subscribe. For data streams sourced by smart tags, the data streams include any contextualization or data labels associated with the tag.

Networking component 412 can be configured to exchange data with one or more external devices over a wired or wireless network using any suitable network protocol. User interface component 414 can be configured to receive user input and to render output to the user in any suitable format (e.g., visual, audio, tactile, etc.). In some embodiments, user interface component 414 can be configured to communicatively interface with a development application that executes on a client device (e.g., a laptop computer, tablet computer, smart phone, etc.) that is communicatively connected to the industrial device 402 (e.g., via a hardwired or wireless connection). The user interface component 414 can then receive user input data and render output data via the development application. In other embodiments, user interface component 414 can be configured to generate and serve suitable graphical interface screens to a client device, and exchange data via these graphical interface screens. Input data that can be received via user interface component 414 can include, but is not limited to, user-defined control programs or routines, data tag definitions, smart tag metadata configurations, or other such data.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

As noted above, that industrial analytic approach implemented by embodiments of the smart gateway platform 302 leverages industry domain expertise to reduce the data space over which AI analytics are to be applied by explicitly defining the data items known to be relevant to a given business objective (e.g., reduction of machine downtime, reduction of specified machine failures such as paper web breaks, optimization of energy utilization by a specified type of industrial machine, improvement of quality of a particular type of product, etc.). Known correlations and/or causalities between these relevant data items—also drawn from domain expertise—are also predefined and modeled into the data, thereby applying useful analytic constraints that lead to a desired insight more quickly and with less processing overhead relative to applying unconstrained big data analysis over unnecessarily large data sets. This domain expertise is encoded in the form of model templates stored on the smart gateway platform 302.

Figure 5:
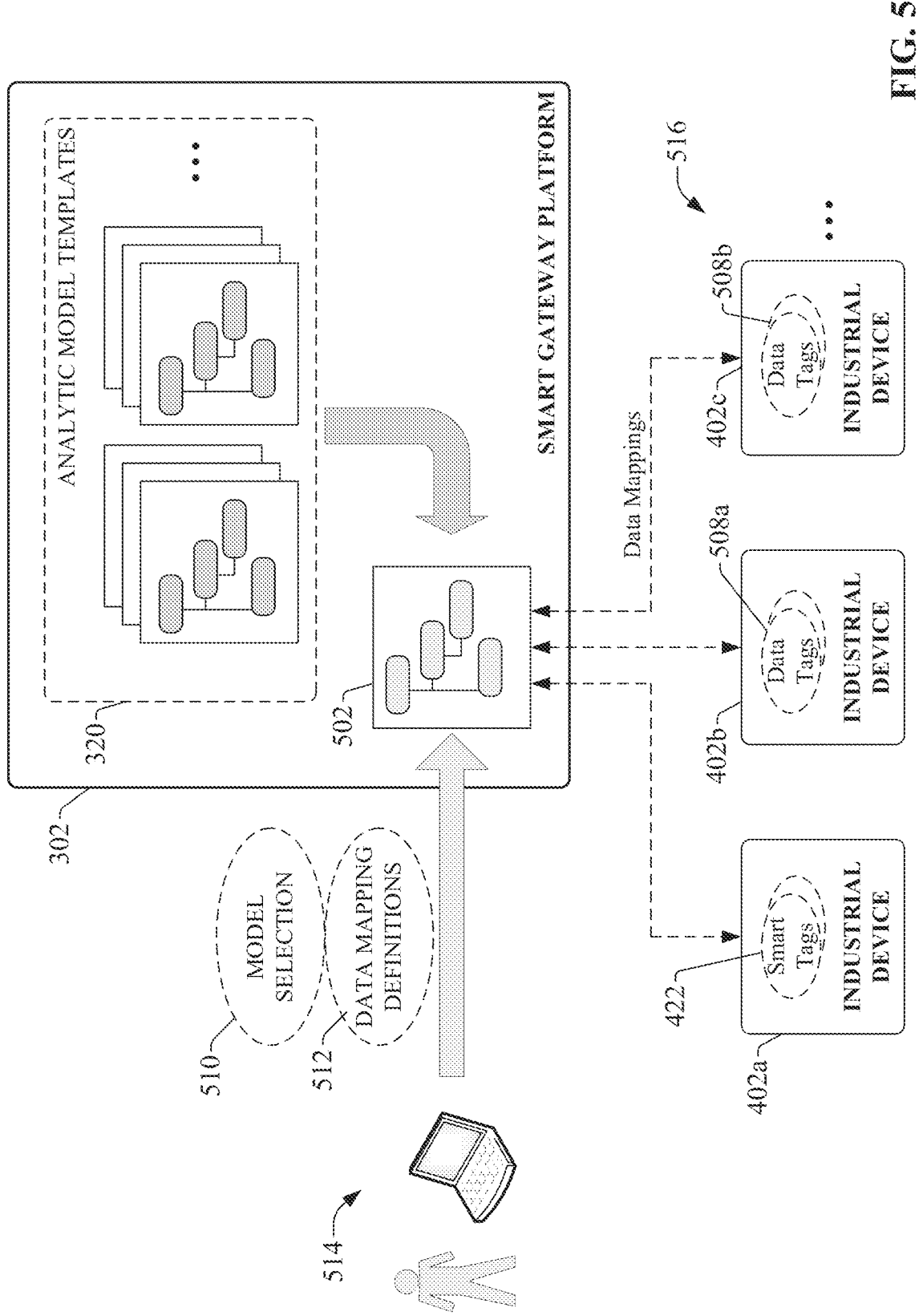
FIG. 5 is a diagram illustrating selection and configuration of a model template designed to model industrial data for subsequent AI analysis.

FIG. 5 is a diagram illustrating selection and configuration of a model template 502 designed to model industrial data for subsequent AI analysis. In one or more embodiments, smart gateway platform 302 can store a library 320 of model templates 502 that are each associated with a corresponding business objective or outcome. Example business objectives can include, but are not limited to, reduction in total machine downtime or number of machine failures; minimization of machine power consumption; optimization of operational efficiency (e.g., amount of machine output relative to an amount of energy consumed by the machine); minimization of emissions; improvement of product quality; identification of factors that yield maximum product output, minimal machine downtime, or maximum product quality; or other such objectives.

Figure 6:
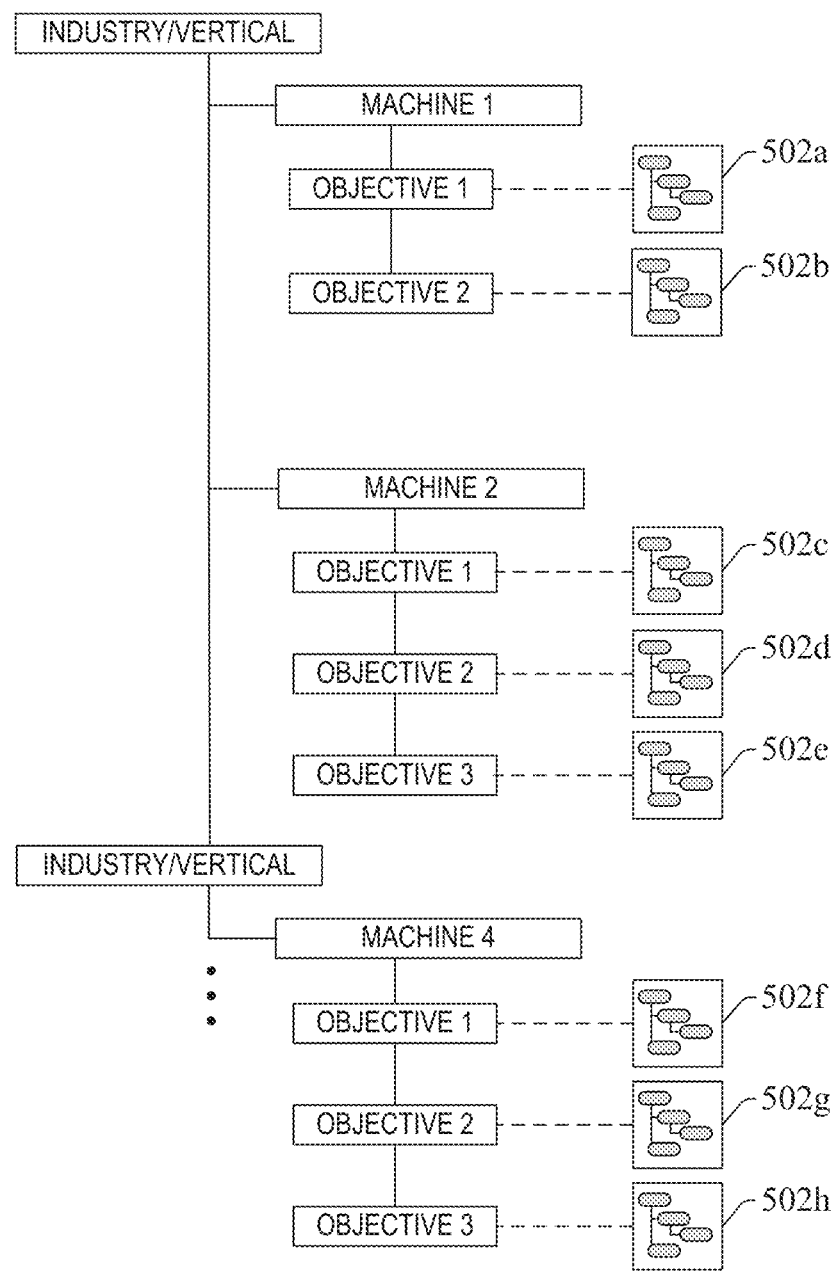
FIG. 6 is a diagram illustrating an example model classification schema for storage of model templates in the smart gateway platform's library.

In some embodiments, these objectives can be grouped according to industry or vertical (e.g., automotive, oil and gas, food and drug, mining, textiles, etc.), machine type, or other such categorizations. FIG. 6 is a diagram illustrating an example model classification schema for storage of model templates 502 in the smart gateway platform's library. User interface component 314 can generate and deliver model template selection screens to a client device that allow the user to navigate the model classification schema in order to select a model template associated with a desired industry-specific and application-specific business objective. According to this example schema, model templates 502 are classified within a hierarchical classification schema according to industry or vertical (e.g., automotive, oil and gas, mining, food and drug, power generation, textiles, etc.). Although only one industry/vertical layer is depicted in FIG. 6, some industries/verticals may include child classifications representing sub-industries classified under the parent industry. For example, selection of an "Automotive" industry classification may prompt the user to select from among several automotive sub-industries, such as Tire and Rubber, Painting, Engine Manufacture, etc.

Under each industry or vertical classification (or sub-industry) is one or more machine selections relevant to that industry or vertical. For example, a Tire and Rubber sub-industry may be associated with several different machines that are typically associated with tire manufacture (e.g., Calendering, Extrusion, Curing Press, Tire Building Machine, Tire Picking Station, etc.). Each machine is associated with one or more predefined business objectives related to the selected machine. Some business objectives may be relatively high level and global objectives, such as minimization of machine downtime or failures, maximization of throughput, minimization of energy consumption, optimization of machine efficiency, etc. Other objectives may be specific or unique to the selected machine and vertical. For example, business objectives associated with a paper cone wrapping machine may include minimization of paper tears or web breaks as the paper is fed from a roller into the machine, or minimization of paper jams as the paper is fed into the machine. In another example, a business objective associated with a washing machine may be to minimize instances of imbalanced spinning.

Selection of a business objective associated with a selected machine invokes the model template 502 associated with that objective. Returning now to FIG. 5, a user selects the desired model template 502 by submitting model selection input 510 (via user interface component 314) that navigates the model template selection hierarchy to the desired business objective. In general, each model template 502 encodes domain expertise applicable to the selected industry- and machine-specific business objective, in terms of which data items are relevant to the problem to be solved and the correlations and causalities between these data items. Each model template 502 specifies which data inputs from the plant-floor industrial devices (e.g., industrial controllers, telemetry devices, sensors, etc.) should be examined by AI or traditional analytics in order to learn causes and possible solutions for the problem represented by the selected business objective, and also defines, where appropriate, correlations and causations between these data inputs that are relevant to the business objective.

These definitions of relevant data items and the relationships therebetween are based on collective domain expertise gleaned from industry experts experienced in designing, maintaining, and troubleshooting the selected machine. For a given operational problem relating to a certain machine that carries out a common industrial application, domain experts may have knowledge of which sensory inputs should be examined in order to determine a root cause of non-optimal machine performance, as well as what machine events, modes, or measured operating parameters correlate to certain outcomes. This collective knowledge can be encoded by the model templates 502 and used to apply useful constraints on subsequent AI analysis (or traditional analytics) in connection with evaluating the desired business objective. Some model templates 502 may also specify a type of analytics to run on the specified data items, which is a function of the business problem to be solved.

Model template 502 defines the relevant data items generically since the sources of these data items may vary across different industrial enterprises. For example, a model template 502 associated with the business objective of maximizing product output for a certain machine may specify that conveyor speed is one of the data inputs relevant to evaluating machine performance and learning possible operational modifications that can increase product output. However, the source of this conveyor speed data depends on the equipment in use at the customer facility. This conveyor speed value may be obtainable from a data tag on a motor drive that controls the conveyor motor at one facility, while at another facility the conveyor speed may be measured by a speed sensor and output as an analog signal. Moreover, the conveyor speed may be available in different data formats at different facilities; e.g., as unstructured raw data or as a structured value having associated metadata identifying a source of the speed value.

Upon selection of a generic model template 502 corresponding to the desired business objective, the smart gateway platform 302 allows the user to customize the template 502 by mapping each data item specified by the model template 502 with a source of the data item available from the user's own industrial assets. To this end, user interface component 314 can render interface displays on the user's client device 514 that present the relevant (generic) data items defined by the template 502 and allow the user to, for each data item, browse available data items discovered on the user's industrial assets 516. Sources of data items may be discovered by the gateway platform's device interface component 304, which can browse the plant network and identify smart tags 422, data tags 508, or other sources of industrial data across the industrial devices 402 that make up the user's industrial assets. The user's selections of specific industrial data sources to be mapped to each data item defined by the template 502 can be submitted as data mapping definitions 512, which transform the model template 502 to a customized analytic model.

By leveraging encoded domain expertise, this guided data mapping process can also inform the user if certain items of sensory data relevant to the desired business outcome are not currently being measured in the user's current system implementation. For example, the end user may be unaware that the humidity level within a plant facility increases the risk of web breaks in a paper feed machine. However, this correlation may be known by domain experts and is therefore encoded in the model template 502 associated with the business objective of minimizing web breaks. Thus, when this model template 502 is selected by the user, the smart gateway platform 302 prompts for a source of humidity data during the data mapping process, informing the user of the need for this information and driving installation of a humidity sensor within the plant if such a sensor has not already been installed.

Figure 7:
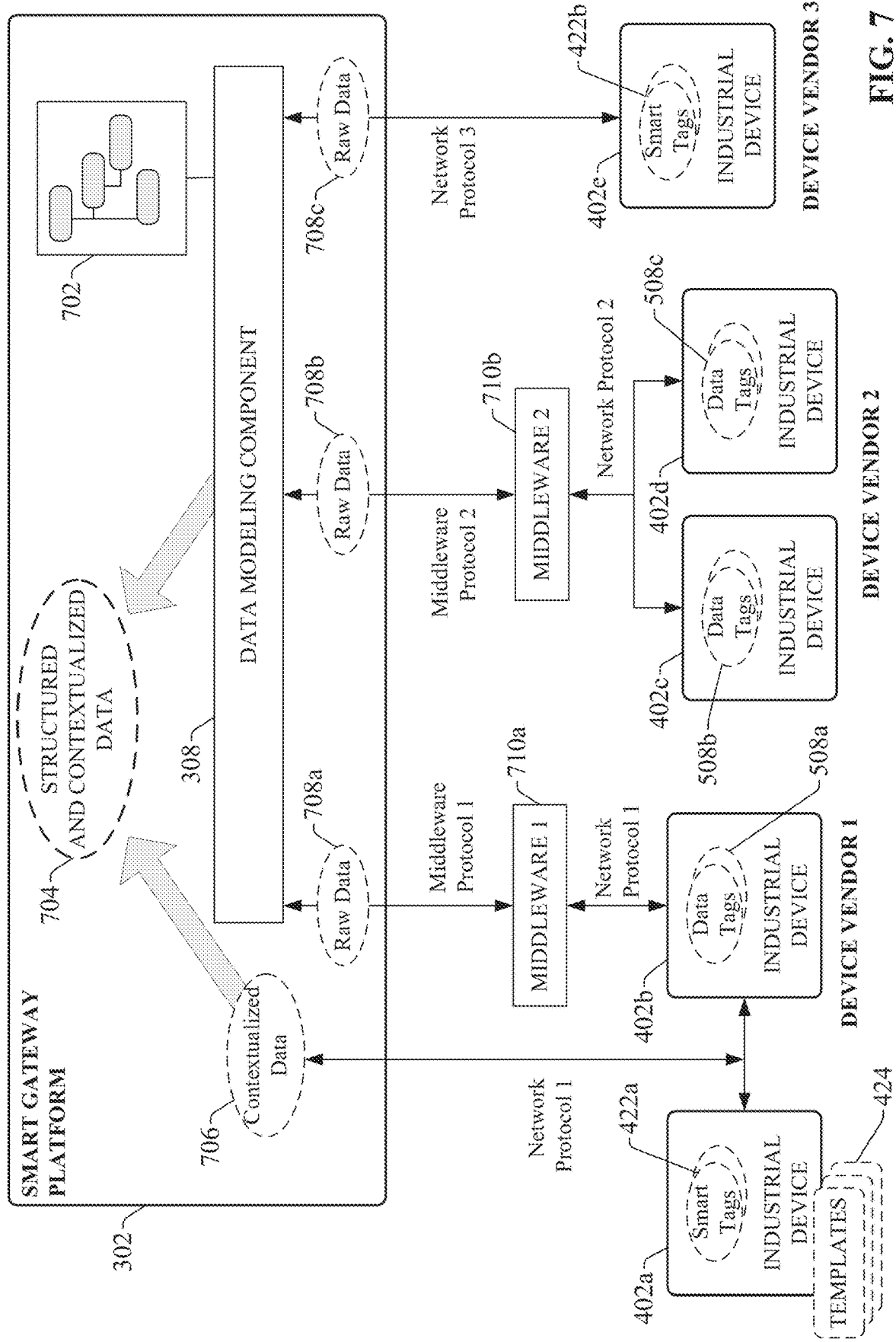
FIG. 7 is a diagram illustrating collection and structuring of industrial data by a smart gateway platform.

Once model template 502 has been customized, smart gateway platform 302 can leverage the resulting customized model to collect and structure the mapped data items for subsequent analysis. FIG. 7 is a diagram illustrating collection and structuring of industrial data by the smart gateway platform 302. In this example, mapping of plant-floor data items to a selected model template 502, as described above, has yielded a customized data model 702 that can be referenced by the smart gateway platform 302 in connection with collecting the specified subsets of available industrial data, as well as pre-modeling the collected data for subsequent AI analytics based on the desired business objective.

The smart gateway platform 302 collects data streams from a disparate collection of industrial devices 402 of different types, vendors, and models. Some of the industrial devices—such as industrial devices 402a and 402e— may support generation of smart data, or data that has been contextualized with metadata in order to provide additional information regarding the context under which the data values were generated. For example, a motor drive that supports creation of smart data may produce a continuous stream of time-series data conveying a speed of a motor that drives a component of an industrial machine or asset. This motor speed data can yield additional valuable insights if the speed data is combined with the operating state of the device or machine (e.g., Running, Faulted, etc.) at the time the motor speed value was measured. In another example, electrical parameters of a device such as voltage, current, and power factor can be similarly linked to the operating state of the device at the time the parameters were measured to yield contextualized data. Embodiments of industrial devices 402 can support creation of such contextualized smart data and storage of this contextualized data in smart tags 422. This smart data 706 can be obtained from smart tags 422 (if supported by the industrial device 402) by the smart gateway platform 302 if the model 702 dictates that this data is relevant to the business objective to be evaluated.

Figure 8:
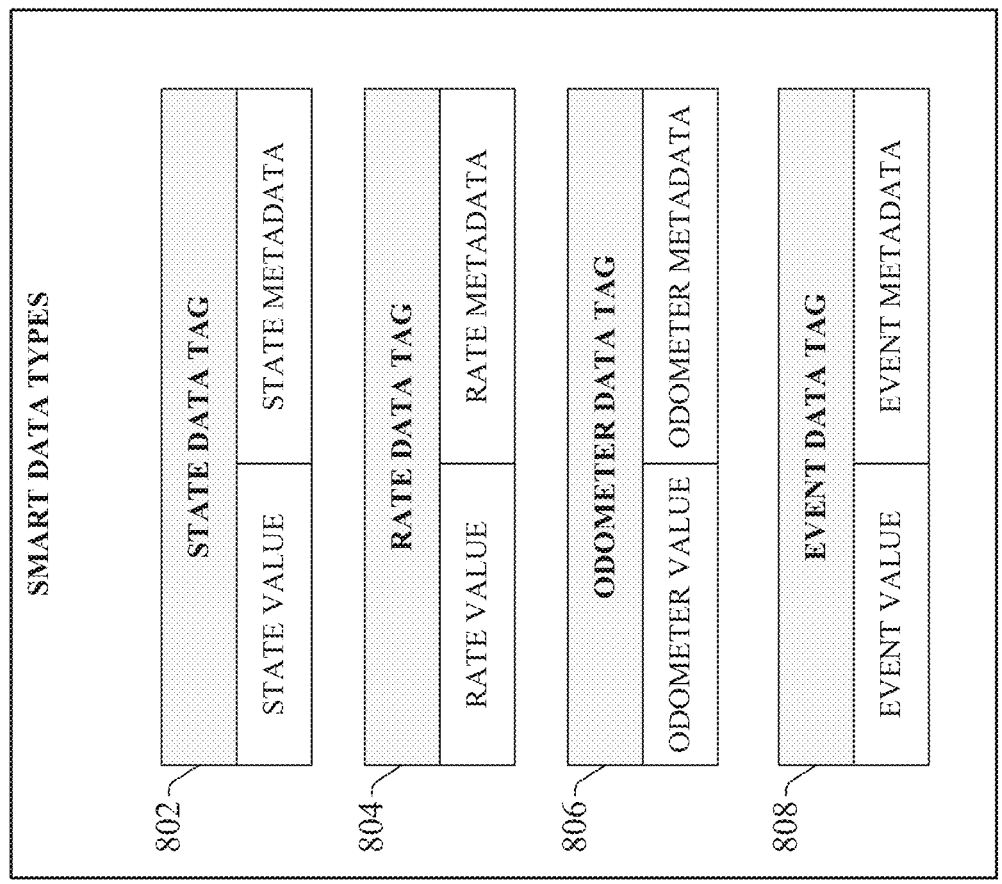
FIG. 8 is an illustration of four example smart data types that can be supported by some industrial device.

Some industrial devices 402 can create contextualized data using special instructions and custom smart tag data structures to perform computations and create names and structure for the contextualized data. FIG. 8 is an illustration of four example smart data types that can be supported by some industrial devices 402. These data types can supplement other standard data types that are typically supported by industrial controllers or other industrial devices (e.g., integer, real, Boolean, string, floating point etc.). In general, data tags (both standard data tags and smart tags 422) are data structures defined within an industrial device that reference a memory location within the device (e.g., an input value, an output value, or an internal data register) and correspond to respective data items. A data tag can be configured to be of a specified data type, such as Boolean, floating point, integer, double integer, string, etc. During development, controller tags can be created and maintained in a tag database of the industrial device 402. The smart tags 422 described herein can be considered additional data types that are catered to industrial automation applications, and that supplement conventional data types.

In the illustrated example, the smart data types comprise four structured information data types—a State data tag 802, a Rate data tag 804, an Odometer data tag 806, and an Event data tag 808. Although the examples described herein assume that the supported smart tags comprise these four data types, it is to be appreciated that some embodiments may include other smart data types without departing from the scope of this disclosure.

Each smart tag includes a field for storing the current value of the smart tag (e.g., a state value, a rate value, an odometer value, and an event value) as well as one or more metadata fields configured to store user-defined configuration data for that smart tag. The metadata values for each smart tag can customize analytics, management, and presentation of the associated smart data value in accordance with the particular industrial asset or industrial application with which the smart tag 422 is associated.

The value contained in a State data tag 802 can represent a current state of an industrial asset or device (e.g., a machine, a production line, a motor drive, etc.). The state data contained in a State data tag 802 can represent one of a set of predefined states representative of a current state or status of the associated industrial asset or device. For example, the State data tag may convey an S88 state (that is, states defined as part of the ANSI/ISA-88 batch process standard), a Packaging Machine Language state, a current state of a state machine defined for the asset, a state of a valve (e.g., OPEN or CLOSED), a state of a motor (e.g., RUNNING, IDLE, FAULTED, etc.), or other types of states.

User-configurable metadata associated with the State data tag 802 may define a state machine representing available states of the associated asset, where each defined state is configured to be invoked in response to a detected condition. For example, each defined state may be linked via the metadata to one or more other related data tags defined in the industrial device 402 (e.g., a data tag representing a state of a sensor or switch indicative of the defined state), such that the current state indicated by the State data tag 802 is a function of the current values of the related data tags. In general, such relationships between related data tags can be defined within smart tag metadata to effectively yield a device-level model that can be leveraged by external analytic systems (e.g., AI analytic systems or traditional analytic systems) in order to quickly learn insights into the associated industrial process or machine operation. In some implementations, these device-level models—encoded by the smart tags and their associated metadata—can define complex correlations and relationships between data tags.

The value contained in a Rate data tag 804 can represent an integer or real value of a measured rate of a metric associated with the industrial asset or device. The rate value can be an instantaneous rate or a value representing a rate of change of the metric over time. For example, the rate value contained in the Rate data tag 804 can represent a temperature, a pressure, a velocity (e.g., a velocity of a conveyor or other motor-driven machine component), an overall equipment effectiveness (OEE), or other such metric.

User-configurable metadata associated with the Rate data tag 804 can define maximum and minimum values for the corresponding rate value, such that the value contained in the Rate data tag 804 will not deviate outside the window defined by the maximum and minimum value metadata. The metadata can also identify one or more data sources (e.g., one or more other data tags or input addresses) that determine the event. For example, the metadata for the Rate smart tag 804 can define whether the corresponding rate value is an aggregation of multiple other values contained in other defined data tags. The rate value can be defined as an average or a sum of two or more identified data tags, or an integral of a data tag over time. Another metadata field can be used to designate an engineering unit to be associated with the rate.

The value contained in the Odometer data tag 806 can represent a cumulative quantity associated with an industrial asset. For example, the Odometer data tag 806 can be configured to represent cumulative quantity with a rollover value, such as a part count associated with the industrial asset. In such cases, the metadata associated with the Odometer data tag 806 can include a definition of the rollover value. The Odometer data tag 806 may also be configured to represent a quantity over a defined time interval, such as an energy consumption associated with the asset. In the case of quantities over a defined time interval, the metadata associated with the Odometer data tag 806 can include a definition of the time interval, which may be defined in terms of daily start and end times, in terms of a start time and a defined duration of the time interval, or as another time definition format. The metadata associated with the Odometer data tag 806 can also define one or more data sources that drive the odometer value. For example, the metadata may define a data tag associated with a Cycle Complete event, such that the odometer value will increment when the Cycle Complete data tag goes high. The odometer value may also be defined to be an aggregation of multiple values. In such cases, the metadata may identify two or more data tags whose values are to be aggregated or summed to yield the odometer value. The metadata can also define a unit of measure associated with the odometer value (e.g., bottles filled, operating cycles, megawatt-hours, etc.).

The value contained in the Event data tag 808 can represent an instantaneous or persistent event associated with an industrial asset. For example, an Event data tag 808 may represent an instantaneous event such as a push-button event (e.g., "Service Button Pushed"), a sensor event (e.g., "Part Present," "Person Detected," etc.), a safety device event (e.g., "Light Curtain Broken"), or another such instantaneous event. Persistent events that can be represented by Event data tag 808 can include, but are not limited to, events associated with an alarm status (e.g., "Alarm Unacknowledged," "Alarm Acknowledged," etc.). Other examples of persistent events that can be represented by an Event data tag 808 can include persistent events with an identifier and a state. For example, events associated with a batch process can include a batch number (an identifier) and an associated event (e.g., "Starting," "Executing," "Complete," etc.). User-configurable metadata associated with the Event data tag 808 can include identifiers of other data tags whose states, in aggregation, determine the event to be represented by the Event data tag 808. Alternatively, if the event represented by Event data tag 808 is a function of only a single input (e.g., a push-button input), the metadata can identify the appropriate input address of the industrial device.

It is to be appreciated that the smart tags described above in connection with FIG. 8 are intended to be exemplary, and that other types of smart tags are also within the scope of one or more embodiments of this disclosure.

Returning now to FIG. 7, smart gateway platform 302 discovers and collects, on a substantially real-time basis, the data items defined by model 702 based on the previously defined data mappings applied to the selected model template 502. In the illustrated example, some industrial devices 402 (e.g., industrial device 402a) support contextualization of data at the device level, while other industrial devices 402 only generate uncontextualized raw data 708 stored in standard data tags 508. Moreover, data from some industrial devices 402 is directly accessible by the smart gateway platform 302 via the plant network protocol (e.g., Network Protocol 1 or Network Protocol 3), while other third-party or legacy industrial devices 402 may be accessible only via middleware applications 710, which wrap the device data in an industry standard wrapper (e.g. OLE for Process Control (OPC) or another middleware protocol). Streaming this raw data 708 over time creates unstructured big data if the data is not contextualized and modeled close to the data source. Accordingly, the platform's data modeling component 308 is configured to contextualize raw data 708 from disparate data sources by naming, combining, and aggregating the data in accordance with model 702. The resulting transformed raw data can be stored together with any pre-contextualized smart data 706 from industrial devices that support smart data tags 422 to yield structured and contextualized data 704 suitable for collective AI or machine learning analysis.

In general, model 702 specifies the data that should be analyzed to yield insights into the desired business objective, and also informs data modeling component 308 how to organize and combine the specified data items into meaningful clusters that can drive the analytics. These clusters are based on the correlations and causalities between the data items as defined by the model 702. Any raw data 708 that is not already pre-modeled and contextualized at the device level (e.g. by smart tag metadata) is transformed by the data modeling component 308 into smart data before being fed to AI analytics as structured and contextualized data 704. This creates a common representation of all the disparate data collected by the smart gateway platform 302. In an example scenario, overall equipment effectiveness (OEE) data from machines of a production line may be in different formats, depending on the vendor, model, and/or age of the industrial devices from which the data is collected. Data modeling component 308 can normalize this disparate OEE data into common representations. Data modeling component 308 can also add metadata to the data collected from the machines to yield contextualized smart data. Data modeling component 308 determines what metadata is to be added to a given item of raw data based on data correlations or causalities defined by model 702. For example, if the model 702 specifies that leak test result data from a leak test station that checks a manufactured engine block for porosity issues is partly a function of a die cast oven temperature at the time the engine block was formed, the data modeling component 308 can add this oven temperature value to the leak test result data as metadata.

In some embodiments, the metadata added to the collected smart and raw data by the data modeling component 308 can include AI metadata that guides subsequent AI or machine learning analysis of the data 704. FIG. 9 is an example data schema depicting items of smart data 902 that have been augmented by the data modeling component to include AI fields 904 defining various AI properties. In some scenarios, model 702 may specify one or more key variables or measurements that are relevant to the business objective of interest, as well as the relationships of the key variables to other variables or measurements. These relationships represent key correlations or causalities relevant to the desired business objective, as gleaned from collective industry expertise. Based on these relationships defined in the model 702, data modeling component 308 can augment the relevant smart data by adding AI contextualization metadata.

This can involve adding new AI fields to the smart data 902 that represents the key variable as well as to the related smart data 902 determined to have an impact on the key variable. Values of the new AI fields 904 can encode relationships between the key variable and its correlated variables (those variables that directly affect the value of the key variable), as well as other information that can place useful constraints on subsequent AI and machine learning analysis.

For example, a new AI field 904 can be added to the key variable smart tag 422 that identifies the smart tag 422 as representing a key variable. Additional AI fields 904 can identify the other smart tags 422 that affect the value of the key variable. If model 702 defines a mathematical relationship between the key variable and the other relevant variables (based on domain expertise encoded in the model 702), this mathematical relationship can also be included in one or more of the AI fields 904 (e.g., as a mathematical function defining the relationship between flow output of a pump, power consumed by the pump, and water pressure).

In some embodiments, AI fields 904 can also define the type or class of analytic problem to be solved relative to the key variable (e.g., modeling, clustering, optimization, minimization, anomaly detection, OEE calculation, etc.). The type of analytic problem can be based on the selected business objective associated with the model 702 (e.g., determine reasons why product quality is falling outside acceptable tolerances, improve product output, minimize energy consumption, etc.). Encapsulating these problem statements in the structure of the smart data 902 can convey to AI analytic systems the nature of data analysis to be carried out on the data 704 on order to generate insights into the selected business objective. For example, an analytics system at a higher level can reference this AI field 904 and, based on the value of the field, trigger the recommended algorithm or machine analysis type. This is in contrast to conventional approaches whereby the analytics system runs an ensemble of predefined analytics algorithms for a given set of data and selects the best solution, which can be more processing intensive.

Since this analytic problem statement is embedded within the structure of the structured and contextualized data 704, real-time analytics systems that interface with the data 704 can identify the prescribed type of analytics defined by the AI fields 904 and carry out the defined analysis with minimal user intervention regardless of the platform on which the AI analytics system executes (e.g., an edge device, a cloud platform, a server, an embedded platform, etc.). Enhancing the smart data 902 to append AI fields 904 that record relationships between variables of the modeled industrial system makes these relationships visible properties of the smart data 902, which can be accessed and leveraged by analytic systems that process the data 704.

In some embodiments, rather than adding the AI fields 904 at the gateway level, some or all of the AI modeling can be predefined at the device level within the industrial device 402. In such embodiments, smart tags 422 at the device level can include AI fields 904 specifying the suitable type of algorithm or machine analysis for obtaining a meaningful insight from the associated smart data, based on the industrial application, vertical, or industrial asset represented by the tag. Industrial devices 402 (e.g., industrial controllers) designed to specify recommended problem formulations in the data structure at the device level in this manner can be easily integrated with enterprise-level analytic systems and reduce the amount of time and work that must be expended by those systems to converge on solutions and insights. Encapsulating problem descriptions at the device level can also provide a means for performing distributed/collaborative analytics and can simplify multi-vendor solutions.

Data modeling component 308 can also organize and aggregate the transformed data to yield structured and contextualized data 704. In some embodiments, data modeling component 308 can model the data to reflect an industrial enterprise hierarchy within which the data sources reside. For example, since many industrial systems are modular and hierarchical, batch processing systems may be represented by a hierarchy comprising layers representing (from highest to lowest) the industrial enterprise, the plant site, the production area within the site, the cell within the production area, the unit within the cell, and the equipment or machine within the unit. Each area in a plant may comprise many machines and associated industrial devices 402. Data from devices that are connected to a given machine can be aggregated at the machine level to produce meaningful contextualized data. This aggregated machine-level data can include, for example, the machine's uptime, throughput, energy consumption, and quality. Further aggregation of machine data at higher levels of the hierarchy can yield cell-level and site-level data. Each level of aggregation can lead to valuable insights in plant operation. These insights become possible due to the organization of the data at different levels of the plant's hierarchy. The smart gateway platform 302 can name, process, and annotate data according to a defined enterprise hierarchy (which may be part of model 702, or may be separately defined and referenced by data modeling component 308), driven by the desired business outcome to be served by the structured and contextualized data 704.

Smart gateway platform 302 can also synchronize the data collected from the industrial devices 402 prior to storage as structured and contextualized data 704. In general, related data items that drive the desired business outcome are collected synchronously and time-stamped to establish relevancy. For example, if the business objective is to optimize the energy consumed by a mixer that mixes cookie dough, smart gateway platform 302 can synchronize the start and stop times of the mixer with the power readings from a power meter to obtain relevant and accurate data for processing. Model 702 may also specify that data items representing the amount of dough, sugar, water, temperature, batch type, and batch sizes are to be correlated with energy. Smart gateway platform 302 can time-synchronize and structure this data accordingly for subsequent data processing and analytics.

In some embodiments, data modeling component 308 can also process raw data 708 to create new OEE data for machines that do not provide such data. For example, if model 702 indicates that machine run time is required for the desired business objective analytics, data modeling component 308 can calculate this run time by subtracting a raw data value representing the time that the machine was not running from another raw data value representing the planned production time. In another example, if model 702 indicates that power consumption is a required factor for the business objective analytics, data modeling component 308 can combine voltage and current data obtained from a motor drive to yield the required power data. The power calculation for all drives (and other devices) can be standardized to a common representation, since devices from different vendors may report current and voltage in different units and formats (e.g., volts, kilowatts, etc.).

In some embodiments, smart gateway platform 302 can also be configured to generate alarms and events that are triggered by limits on individual or combined data values. These notification data types can be named in the smart gateway platform 302.

Figure 10:
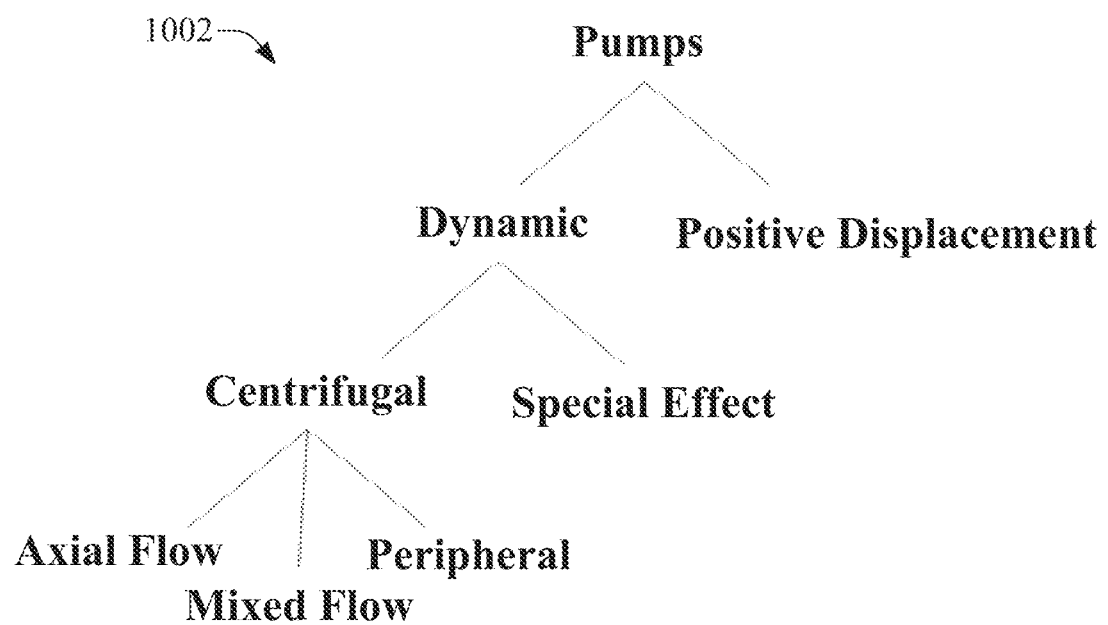
FIG. 10 is an example asset type hierarchy for industrial pumps.

Some embodiments of data modeling component 308 can further model at least some of the raw data and smart data to conform to an object-oriented asset model if appropriate. Industrial plants typically operate many common industrial assets, including pumps, boilers, and compressors. Many such assets are deployed within the plant, and in some cases there may be many types and models of these assets. Some asset types can be described hierarchically. FIG. 10 is an example asset type hierarchy 1002 for industrial pumps. Pumps can be categorized according to two different types of pumps—dynamic and positive displacement. Dynamic pumps can be either centrifugal or special effect. Centrifugal pumps can be axial flow, mixed flow, or peripheral. A common type of centrifugal pump is an electrical submersible pump.

In some embodiments, the smart gateway platform 302 can transform items of data (either raw data or smart data) received from industrial assets to add object-oriented model metadata describing the asset's hierarchical path within the asset hierarchy (e.g. Pumps.Dynamic.Centrifugal.Peripheral). Such hierarchical data models can assist analytic systems to organize the data for analytics, presentation dashboards, or other such data manipulation. For example, if data from various types of pumps is modeled according to the pump type hierarchy depicted in FIG. 10, analytic systems can easily compare the efficiency of two different pump types—e.g., axial flow pumps and mixed flow pumps—by segregating data for these two pump types and comparing the two resulting data sets. Such data modeling can also allow specific pump types to be selected for focused, type-specific data analytics. By utilizing such a hierarchical asset model, data associated with each pump (e.g., pressure, flow rate, liquid volume, energy loss, pump efficiency, etc.) is inherited by all child nodes in the hierarchical path for a given pump (e.g., a flow rate for a given axial flow pump is applied to the pump itself, as well as to the axial flow, centrifugal, dynamic, and pump hierarchical classifications). Connecting contextualized smart data to object-oriented asset models can yield relevant data from industrial controllers and devices that is mapped to assets for rapid transformation into business value by analytic systems.

In conventional big data analytics, data scientists spend a considerable amount of time pre-processing or "cleansing" data in preparation for analytics. Using some or all of the data management techniques described above—driven by initial selection of a desired business objective—the smart gateway platform 302 can eliminate the need for such data cleansing by transforming unstructured industrial data into contextualized and structured smart data that is conducive to AI and machine learning analytics and organized reporting, or to other functions.

Although the data modeling functions performed by data modeling component 308 have been described above within the contexts of modeling data at the level of the smart gateway platform 302, some embodiments of industrial devices 402 can support performing any or all of the functions associated with the data modeling component 308 at the device level, yielding at least a portion of the contextualized smart data 706 obtained or streamed from those industrial devices 402. Moreover, at least some of the device-level smart data modeling—e.g., defined by the smart tag metadata as discussed above—can be predefined on the industrial device 402 based on domain expertise relevant to a business objective. In an example implementation, vertical-specific and application-specific templates 424 (which may be similar to model templates 502) stored on industrial devices 402 that support smart tags 422 can pre-define known correlations between data points and encode these correlations in the smart tag metadata. These correlations and relationships can be pre-defined based on industry expertise of the relevant vertical and application. The data structures of smart tags 422 can encapsulate both system information (e.g., the data structure for a boiler) as well as associated domain expertise relevant to analysis of the smart tag's data (e.g., identities of other variables that should be monitored to ensure health of the boiler). In some embodiments, the smart tags 422 can also encapsulate relevant extrinsic data such as humidity, day of the week, solar activity, local temperature, etc. Pre-modeling industrial data at the device level based on such domain expertise can yield a workable analytic model more quickly relative to employing a data scientist with high cost, low availability, or limited relevant industry knowledge.

In general, smart tags 422 can be structured and organized at the device level according to reusable industry- and application-specific templates 424 that define known relationships and correlations according to pre-packaged domain expertise. Applications represented by templates 424 can include both industrial applications (e.g., sheet metal stamping, web tension control, die cast, etc.) as well as external software applications (e.g., product lifecycle management, CAD, etc.) that consume the data and that require data to be organized and formatted in certain ways. For example, application-specific templates 424 may identify a subset of available data relevant to energy, overall equipment effectiveness (OEE), etc., and define a pre-organization of this data—terms of relationships and correlations between data items—that can quickly lead external analytic systems to relevant insights in those areas. The reusable templates 424 can identify meaningful data based on role, function, or business value (e.g., predictive maintenance), and the subset of smart tags 422 that feed into a desired function. The resulting data models at the device levels can be replicated and translated at higher levels with less manual coding or preparation.

Pre-defined device-level templates 424 can also be associated with specific devices or industrial assets (e.g., drives, boilers, etc.), and can define clusters of smart tags 422 associated with the corresponding device 402. These templates 424 can also define calculations for deriving meaningful statistics for the device 402 (e.g., KPIs), as well as recommended mashups, augmented reality overlays, or other types of visualizations suitable for presenting data associated with the device 402. These various templates 424 can build domain expertise into the organization structure of the device data itself.

In some embodiments, device-level templates 424 can also be generated by an end user during development of the industrial device's control programming for storage on the device. In an example implementation, pre-configured equipment models may be made available within the integrated development interface (IDE) on which the control program is generated. These equipment models can be selected for inclusion in the program and simultaneously incorporated into the device-level data model to be used to contextualize data generated by the finalized program. Design-time modeling can also be achieved by interpreting digital drawings (e.g., P&ID drawings) imported into the IDE. Engineering drawings other types of documentation generated during the bid/design/build cycle can suggest relationships between drives and other components, which can be identified by the IDE and incorporated into the device-level (or higher-level) data models. Other types of design documents from which a designer's intent can be inferred (e.g., CAD files) can also be imported and interpreted in this manner.

Since a given data tag may be used for different purposes (e.g., quality assessment, production etc.), there may be multiple templates 424 defined at the device level for the same data, with each template 424 specific to a different business or analytic objective. In some implementations, higher-level applications can select one of the available templates 424 as a function of the desired insight or business objective. In this way, device-level data modeling can encapsulate the data structures in different ways for customized consumption by multiple different higher-level applications, allowing the data to be consumed differently by multiple parties. Data can also be combined to yield a composite stream that flows upward through the enterprise layers.

In some embodiments, the industrial device's smart tag configuration component 408 can also allow users to further augment selected smart tags 422 with custom metadata (e.g., via user interface component 414) defining customer-specific correlations between data points, allowing end users to augment smart tags 422 with their own opinions or knowledge regarding which data items are most relevant to a desired business outcome (e.g., which boilers or other assets are most important to monitor to learn a desired insight). Analytic systems can subsequently use the pre-defined and user-defined smart tag metadata to build analytic models that incorporate built-in domain expertise as well as user-provided application expertise, quickly and easily driving the data to desired business outcomes without the need for data janitors or extensive expert coding.

In some embodiments, contextualization metadata at the device level can be responsive to changes in system or asset reconfigurations. For example, if a machine or line is reconfigured in a manner that changes the associated data's organization, the smart tag configuration component 408 of the corresponding industrial device 402 can update the device's smart tags 422 to reflect these contextual changes. Alternatively, end users can easily update the smart tags accordingly via user interface component 414.

Figure 11:
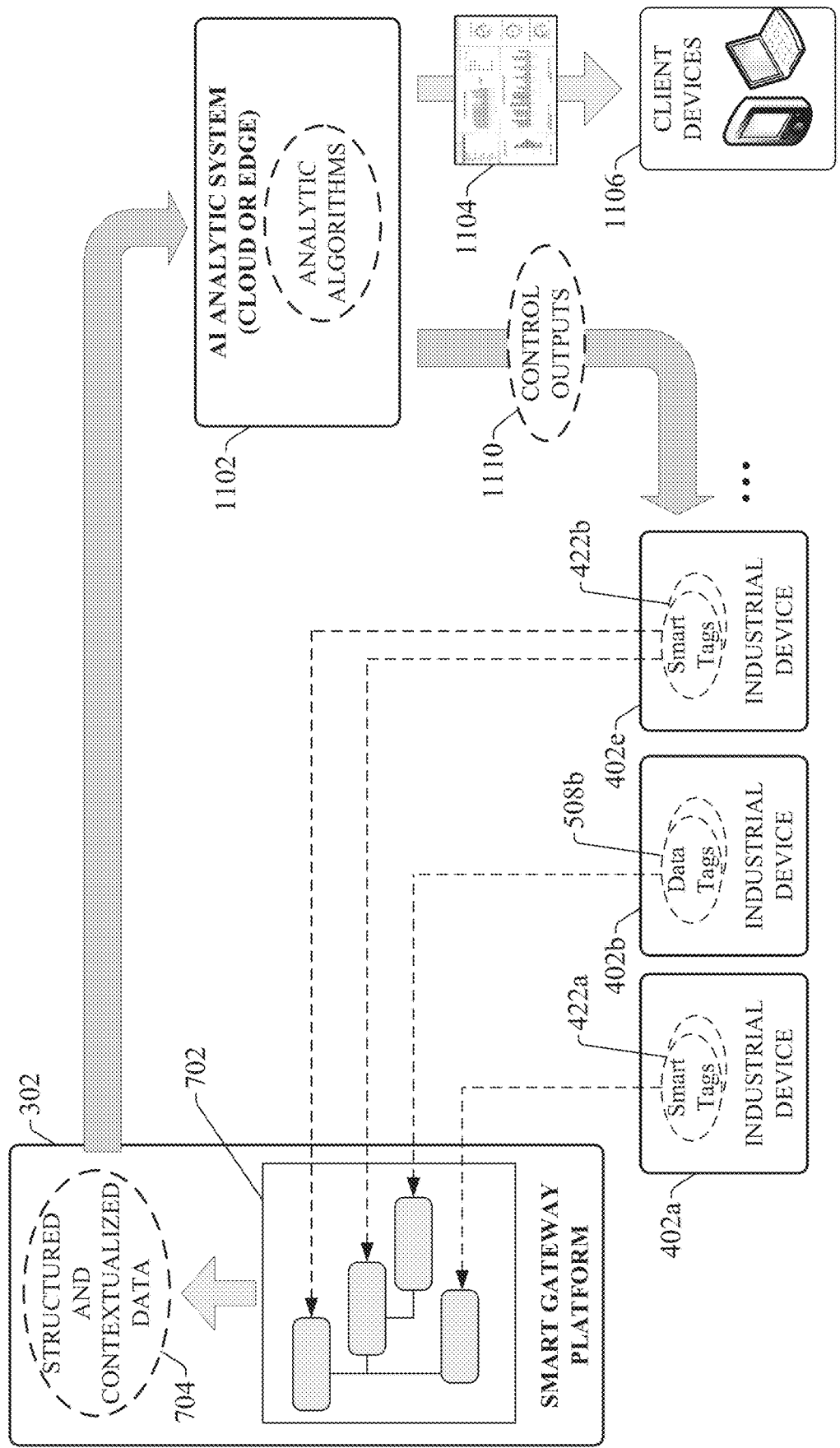
FIG. 11 is a diagram illustrating an example architecture in which a smart gateway platform collects, contextualizes, and structures data from industrial assets and provides the resulting structured and contextualized data to an AI analytic system.

As noted above, the structured and contextualized data 704 generated by the smart gateway platform 302—or obtained as pre-modeled data from the industrial devices 402 in the case of devices that support smart tags 422 and device-level data modeling—can be fed to an analytic system, which can perform AI or machine learning analytics on the structured data in order to glean insights and generate recommendations relating to the business objective associated with the model 702. FIG. 11 is a diagram illustrating an example architecture in which the smart gateway platform 302 collects, contextualizes, and structures data from industrial devices 402 and provides the resulting structured and contextualized data 704 to an AI analytic system 1102. Although FIG. 11 (and other examples described herein) depicts data 704 being fed to an AI analytic system 1102, other types of analytics can be applied to the data 704 without departing from the scope of this disclosure, including but not limited to machine learning or statistical analysis. After model 702 has been customized by mapping the model's defined data items to specific data items on the industrial devices (e.g., smart tags 422 and/or standard data tags 508), the smart gateway platform 302 begins collecting and transforming the data from the mapped data sources as described above to yield structured and contextualized data 704. Since the collected data is contextualized and structured based on relevant correlations and causalities defined by the model 702—that is, correlations and causalities defined as being relevant to the particular business objective being examined—these correlations and causalities are provided to the AI analytic system 1102 as metadata associated with the collected data items. The platform's analytics interface component 312 can be configured to exchange data with the AI analytic system 1102 and feed the data 704 to the analytics system 1102.

Informing AI analytic system 1102 of relevant data correlations and causalities between the data items prior to application of data analytics can apply useful constraints on data analysis performed by the AI analytic system 1102. These constraints can drive the analytic system 1102 to useful insights more quickly relative to unconstrained big data analysis, significantly reducing the amount of time required for the AI analytic system 1102 to discover insights and generate useful recommendations relative to the desired business objective. These predefined correlations and causalities can also mitigate discovery of spurious or irrelevant correlations between the data items by the AI analytic system 1102. By limiting the set of data supplied to the AI analytic system 1102 to only those data items deemed relevant by the model 702, and by structuring and contextualizing these data items based on predefined correlations and causalities derived from collective industry expertise, the smart gateway platform 302 narrows the data space to be analyzed by the analytic system 1102, assisting the analytic system 1102 to discover useful insights and generate recommendations more quickly relative to unconstrained big data analysis. The limited set of collected data items can also simplify data life cycle management.

Subsets of the data items collected by the smart gateway platform 302, as well as results of AI or machine learning analytics applied by analytic system 1102 on the data, can be delivered as visualization presentations 1104 to one or more client devices 1106 having permission to access the analytic results. Information rendered on visualization presentations 1104 can include recommendations or actionable insights about operation of the industrial devices relative to the business objective originally selected by the user. For example, if the originally selected model template 502 (on which model 702 is based) pertains to the business objective of maximizing product output of a certain type of industrial process, smart gateway platform 302 will collect, structure, and contextualize data items known to be relevant to obtaining actionable insights into this problem. This structured and contextualized data 704 is fed to AI analytic system 1102 (e.g., as streaming smart data), which performs AI or machine learning analysis on the smart data streams with the goal of determining root causes of productivity loss and generating recommended countermeasures or actionable insights. In this regard, reduction of the relevant data set by the smart gateway platform 302 to those data items known to be relevant to the business objective, as well as the known correlations and causalities between the data items encoded into the smart data based on model 702, can lead the AI analytic system 1102 more quickly to actionable insights regarding the defined business objective.

In an example scenario, AI analytic system 1102 may determine, based on application of AI or machine learning to the structured and contextualized data 704, that downtime of a particular production line (e.g., Line 5) that is part of the overall process is a significant cause of productivity loss. Accordingly, AI analytic system 1102 may determine, based on further AI analytics, one or more possible countermeasures for reducing the total accumulated downtime of Line 5 (e.g., reducing an operating speed, increasing a frequency of maintenance performed on Line 5, modifying an operating sequence, etc.). The discovered root cause and associated recommended countermeasures can be presented to the user via visualization presentations 1104. If AI analytic system 1102 is designed to perform predictive analysis or trend analysis, the system 1102 may also identify indications within the data 704 that typically precede a downtime event, and continue monitoring the structured and contextualized data 704 for the presence of these indications. In response to determining that relevant items of data 704 satisfy the criteria indicating an impending downtime event, the analytic system 1102 may generate and deliver a notification to one or more client devices 1106 informing of the predicted downtime event.

In some embodiments, in addition to or as an alternative to rendering recommendations and actionable insights into solving the specified business objective, analytic system 1102 can generate and direct control outputs 1110 to one or more of the industrial devices 402 based on results of analytics applied to the data 704. Control outputs 1110 can be configured to alter a configuration or operation of selected industrial devices 402 in a manner predicted to move operation toward the specified business objective. For example, if analytic system 1102 determines that reducing a speed setpoint of a motor drive will reduce downtime instances of a particular production line, thereby achieving the business objective of improving production output, system 1102 may direct a control output 1110 to the selected motor drive that alters the speed setpoint accordingly. Analytic system 1102 can deliver control outputs 1110 to the target industrial devices via any suitable means, depending on the system architecture. For example, if analytic system 1102 is an edge device that resides on the same plant network as the industrial devices, control outputs 1110 can be delivered directly via the network. In another example architecture, analytic system 1102 may deliver control outputs 1110 to the target industrial devices 402 via the smart gateway platform 302.

As noted above, the structured and contextualized data 704 submitted to the analytic system 1102 by the gateway platform 302 is pre-modeled with data relationships and correlations based industry and user expertise encoded in one or both of model 702 or smart tag metadata (based on templates 424). In some embodiments, external AI analytics can also identify additional correlations in real-time during operation and feed these relationships back to the device-level or gateway models. In this way, the pre-packaged data models at the device level or on the gateway platform 302 can be refined according to the idiosyncrasies of a customer's unique system and application, as discovered by external analytics. Moreover, some embodiments can implement a hybrid self-driving AI approach that further enhances the device-level models based on response input from experts. For example, a domain expert can rank the quality of a clustering result, and this expert feedback can be used to modify the parameters for the clustering.

Figure 12:
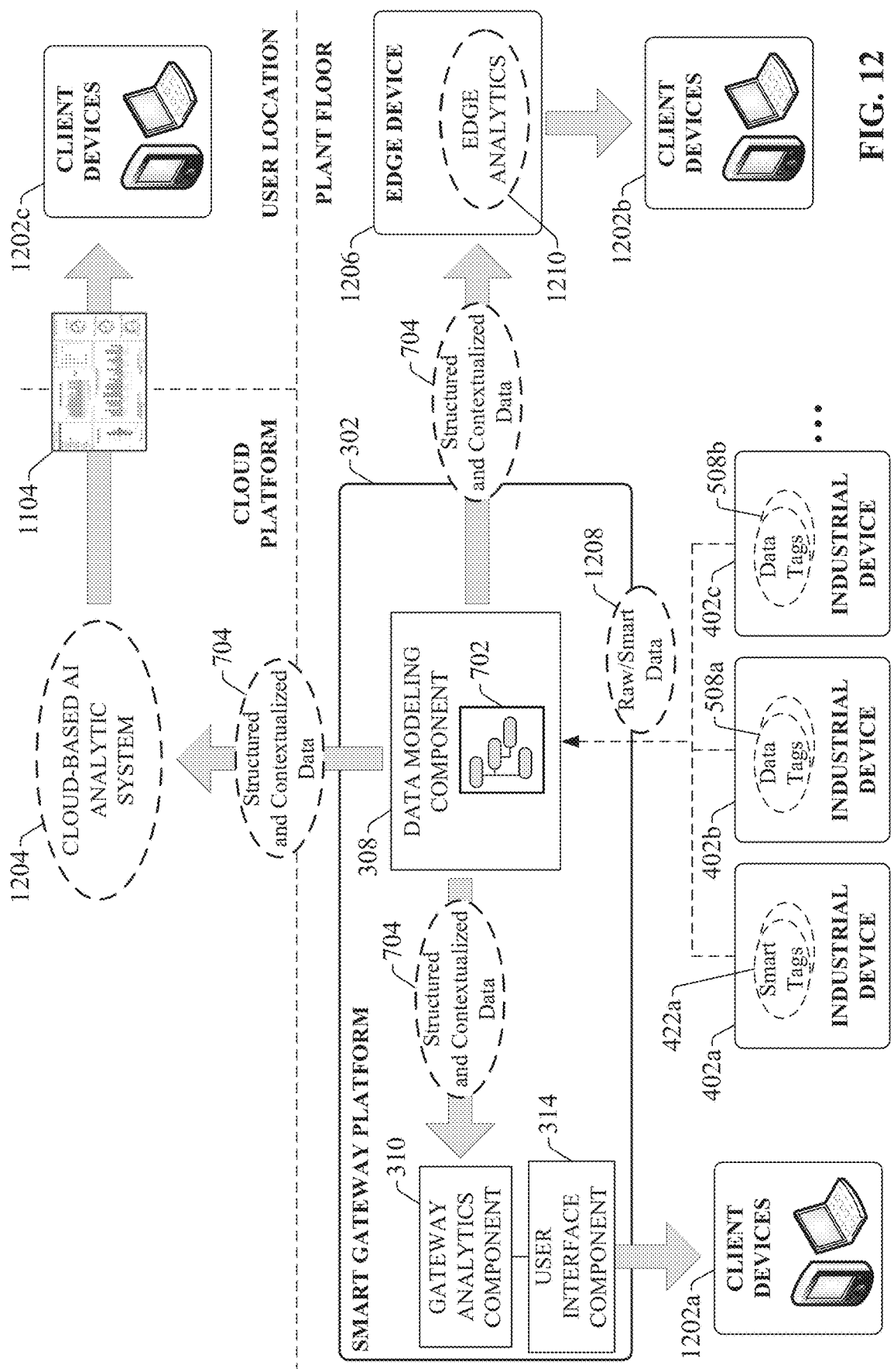
FIG. 12 is a diagram illustrating an example architecture in which a smart gateway platform provides structured and contextualized data to analytic systems at various levels of an industrial enterprise.

The AI analytic system 1102 to which smart gateway platform 302 feeds the structured and contextualized data 704 may execute on the smart gateway platform 302 itself (e.g., as gateway analytics component 310), may execute on a separate edge device on the plant network 116, or may execute at a higher level of the industrial enterprise or on a cloud platform. FIG. 12 is a diagram illustrating an example architecture in which smart gateway platform 302 provides structured and contextualized data to analytic systems at various levels of an industrial enterprise. As described above, the platform's data modeling component 308 contextualizes, models, and structures raw and/or smart data 1208 collected from industrial devices 402 in accordance with model 702. The platform's analytics interface component 312 passes the resulting structured and contextualized data 704 to an analytics system for AI or machine learning analysis. The industrial environment depicted in FIG. 12 includes AI analytic systems that execute at various levels of the enterprise, including a local gateway analytics component 310 that is integrated with the smart gateway platform 302 itself, an edge-level analytic system 1210 that executes on an edge device 1206 (e.g., a network infrastructure device or other type of device that links the plant network to the cloud, the Internet, or another network), and a cloud-based AI analytics system 1204 that executes on a cloud platform. Any of these analytic systems can perform analytics on the structured and contextualized data 704 as described above. Each of these analytic systems can provide visualization presentations 1104 containing notifications, recommendations, or actionable insights to authorized client devices 1202 as also described above.

Figure 13:
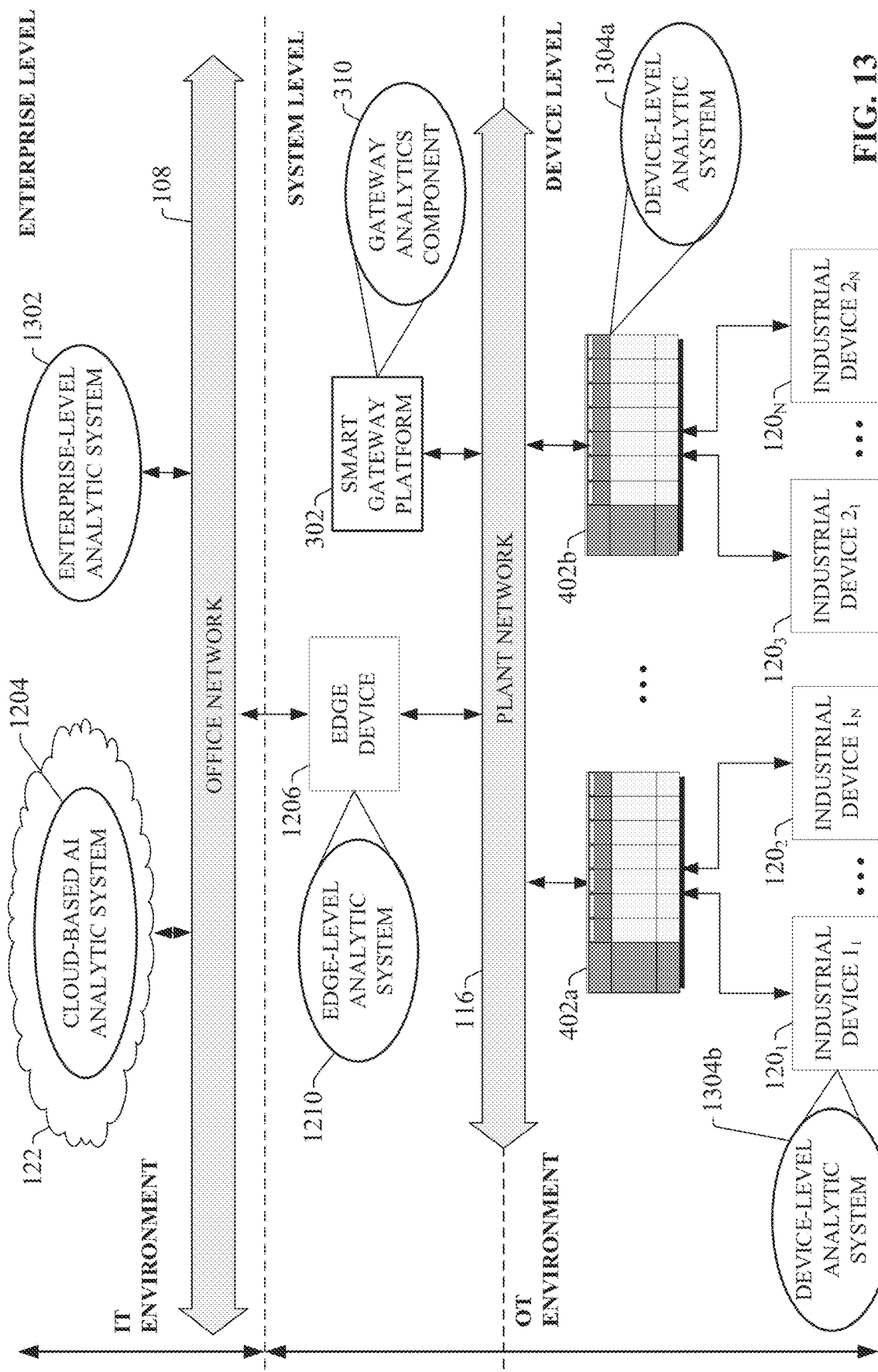
FIG. 13 is a diagram of an example scalable industrial analytics architecture.

In some scalable analytic architectures, analytics systems can also execute on the device level and on the enterprise level on a local network, in addition to the analytic systems that execute on the smart gateway platform 302, edge devices 1206, and cloud platforms. FIG. 13 is a diagram of an example scalable industrial analytics architecture. Such multi-level analytic architectures—with smart gateway platform 302 serving as a source of aggregated, normalized, and pre-modeled data—can be designed such that AI analytics are performed on a device or level of the industrial enterprise most relevant to the type of analytics being performed.

In this example architecture, the OT environment (as distinct from the IT environment) is defined to encompass the industrial devices, machines, lines industrial servers, and edge devices on the plant floor. Many of these OT devices and systems have significant native processing capabilities. Data functions such as transformation of raw industrial data from the industrial devices 402 (including industrial controllers and lower level industrial devices 120) into smart data, or performance of real-time analytics intended to regulate operation of the industrial devices 402, are best performed on the OT level; e.g., on the smart gateway platform 302, on the edge-level analytic system 1210, or on device-level analytic systems 1304. Real-time analytics are defined as analytics that occur in the OT domain that result in real-time actions, such as changing a set point of an industrial device or otherwise altering operation of an industrial process. Other higher level (enterprise level) analytics may be best suited for execution in the IT domain; e.g. by enterprise-level analytic systems 1302 or cloud-based analytics systems 1204. Analytics in the IT or cloud domain typically produce higher-level insights for visualization on client devices using dashboards or other visual presentations. Such higher-level analytics are referred to as non-real-time analytics since they do not typically result in immediate feedback control of industrial assets. Non-real-time analytics may also be referred to as human real-time analytics, as opposed to machine real-time analytics. For manufacturing plants with significant computing resources throughout the OT environment, a majority of data processing and value extraction is likely to occur in the OT environment. For field-based assets with limited computing resources, most of the data processing may instead occur on the cloud platform 122.

For simplicity, the example architecture depicted in FIG. 13 can be divided into three hierarchical levels: the device level, the system level, and the enterprise level. The enterprise level is part of the IT environment, while the device and system levels are part of the OT environment. Device-level analytics can perform such real-time functions as checking measured operating parameters against defined limits, which can provide useful insights into a device's operation. System-level analytics (e.g., performed by edge-level analytic system 1210 or gateway analytics component 310) can derive insights relating to higher-level system operation, such as predicting that a trend in a paper web's tension is indicative of an impending web break within a few operating cycles. Operational insights obtained by device-level and system-level analytics, when implemented in controllers and industrial computers, enable real-time control actions intended to move system performance toward the business objective associated with model 702. In general, real-time analytics result from processing real-time data in the OT environment. At the enterprise level, selected contextualized or smart data from the OT environment can be analyzed and combined with data from other parts of the industrial enterprise to develop data presentations (e.g., dashboards or other visual presentations) that deliver actionable insights to a user via a client device.

This approach of locating data processing and analytics functions in a scalable manner is well-suited to industrial Internet-of-Things (IoT) applications with varying time domains of processing (e.g., milliseconds, seconds, minutes, hours, etc.), asset locations (centralized and remote), and system relationships (e.g., autonomous, in-line, buffered, batched, etc.). Analytics and AI/machine learning at each of these three defined levels can optimize processes and operations in industrial plants to achieve desired business objectives.

Within an architecture comprising one or more device-level, system-level, and enterprise-level analytics systems, a device-level or system-level analytic system can perform analytics on the device or system level when appropriate (e.g., on industrial controllers or other industrial devices 402, on low-level industrial devices 120, on edge devices 1206, etc.), and can shift analytics tasks to enterprise-level analytics systems to perform analytics scoped to the enterprise level as needed. Device-level analytic systems 1304 can perform local analytics on device data when device-level results are required. Device-level analytics performed by analytic systems 1304 can include, but are not limited to, determining whether a particular industrial device (e.g., a controller, sensor, drive, meter, etc.) is at risk of failure or should be replaced based on analysis of local data associated with that device (or data associated with a process or machine controlled by the device), determining a root cause of a device fault, etc.

Device-level analytic systems 1304 can also leverage the data modeling templates 424 and device-level models represented by smart tags 422 to optimize real-time operation. In an example scenario, after being placed in a shutdown state a production line may take some time to transition back to normal operation after being restarted due to the amount of time required for the line to rebalance. The time required for the line to rebalance itself and return to its normal workflow can adversely impact the line's overall equipment effectiveness (OEE). To address this, a template 424 may define a data modeling for optimizing production line start-up. The template 424 can identify, for example, which subset of available data elements (e.g., smart tags 422) drive optimization of line start-up and the relationships between these data elements. The resulting device-level data modeling can be used by device-level analytic systems 1304 at the controller to determine an optimal start-up sequence that minimizes the time required to resume normal line operation. Driving computing services down to the lower levels of the architecture in this manner—using the device-level models to aid local analytics—can reduce communication bandwidth by performing optimization analytics at the device level rather than sending the data to higher level optimization systems. This approach can also reduce latency, making control-level analytics applications possible (e.g., identifying pump cavitation in a drive, making it possible to rapidly trim the pump speed).

Results of the device-level analytics can be consumed locally by the industrial device itself, or sent to a client device (e.g., as a notification or dashboard). For example, in response to a determination by a device-level analytic system 1304 that an industrial controller or device that hosts the analytic system 1304 is at risk of failure or an unacceptable loss of efficiency, and if the analytic system 1304 identifies an automated countermeasure that may mitigate or delay the device failure, analytic system 1304 can generate a control instruction that implements the countermeasure on the host device; e.g., by altering the device's operation in a manner that has a likelihood of mitigating the failure. Such countermeasures can include, but are not limited to, switching the device to a slow operation mode or stopped mode, switching the device to a backup power supply, changing a setpoint defined in the device, initiating execution of a different control program or sub-routine (in the case of industrial controllers or other programmable devices), or other such countermeasures.

In the case of system-level analytic systems 1210 or 310, risks associated with operation of more complex industrial automation systems—rather than a single device—can be monitored and identified, and appropriate countermeasures scoped to the entire automation system can be implemented. In an example scenario, if a system-level analytic system 1210 or 310 predicts—based on analysis of structured and contextualized data 704 prepared by the smart gateway platform 302—that a production line is at risk of producing an excessive amount of product waste (e.g., due to an increase in the number of part rejections, a discovered inefficiency in a process carried out by the production line, an indication of excessive wear on one or more devices that carry out the process, etc.), the system-level analytic system 1210, 310 can implement a multi-device countermeasure intended to mitigate the risk of product waste. This can involve generating multiple sets of instruction data directed to devices that make up the automation system, where the instructions are configured to alter operation of the target devices in a coordinated manner to effect the countermeasure on the automation system as a whole, thereby reducing the risk of product waste. Such system-wide countermeasures can include, for example, reducing the rate of production on a production line, switching production of the product to an alternative production line (which may involve sending instructions to control devices of the current production line to cease production, sending further instructions to the new production line to begin production, and sending still further instructions to appropriate upstream systems to begin providing material or parts to the new production line), sourcing a production line with parts from an alternate production line or source, or other such countermeasures.

Although the smart gateway platform 302 is depicted in FIG. 13 as being embodied separately from edge device 1206, some embodiments of smart gateway platform 302 can be embodied on an edge device 1206. With this configuration, high-level or external applications can discover device-level data and associated models via gateway functionality implemented on an edge device 1206, which then acts as a standardized interface that provides data and associated model information in a consistent manner regardless of the analytics package accessing the data. By implementing smart gateway functionality at the edge, edge devices 1206 can model third-party or legacy data from the device level, thereby generating smart tags from legacy controllers or other devices that do not support pre-created device-level models. In some scenarios, performing data modeling on legacy data is more beneficially performed at the edge layer than at higher layers such as the cloud, since the data model may lose context by the time the data reaches these higher layers. Moreover, the extra latency involved in moving unmodeled data to these higher levels can prevent accurate timestamping of the data. Accordingly, edge device 1206 can be configured to time-stamp data from the adjacent device-layer, ensuring accurate synchronization of data from the disparate devices.

In addition to monitoring devices and systems and implementing control modifications as needed, device-level, edge-level, and system-level analytic systems can also send analytic results to authorized client devices in the form of notifications, dashboards, or other graphical interfaces. In addition, when appropriate, the device-level, edge-level, or system-level analytic systems can send results of local analytics to the enterprise-level analytic system 1302 or cloud-based analytic system 1204 for enterprise level analysis. The device-level, edge-level, and system-level analytic systems can also send results of local analytics to other analytic systems on the same level or a different level of the enterprise. Analytic results sent from one of the analytic systems to another can be processed at the receiving system for further analytics. In this way, multi-level analytic systems can carry out inter-node collaborative analysis in connection with performing plant-level analytics, such that analytical tasks are carried out at the level of the enterprise deemed most suitable for the given analytical task. Analytics can also be scaled downward from higher levels to lower levels as appropriate.

In an example scenario, the decision to scale analytics upward or downward between analytic systems can be based on time-sensitivity of the analytics being performed. For example, if a system-level analytic system (e.g., edge-level analytic system 1210 or gateway analytics component 310) is performing analysis on a current production run of a product in which the result of the analytics may determine how the current run is to be executed, the system-level analytic system may shift at least a portion of the analytic processing to a device-level analytic system 1304 hosted on an industrial controller or another industrial device 402 that is part of the automation system executing the production run. By shifting relevant analytics to the device-level analytic system 1304 hosted on a controller or device that participates in the control process, the analytic result generated by the device-level analytic system 1304 can be leveraged more readily by the control devices that control the industrial process. In general, analytic systems can be configured to identify criteria indicating that data or analytic results are to be scaled or transferred to another analytic system; namely, the particular device, group of devices, industrial assets, or systems affected by a result of the analysis. The decision to send analytic results or other locally available data to another analytic system can be based on a determination of whether the result or data satisfies a criterion indicative of an importance or relevance of the result or data to another portion or layer of the overall enterprise architecture.

In some embodiments, in addition to providing pre-modeled plant floor data that has been contextualized at the device level for higher-level analysis, industrial devices 402 that support smart tags 422 and associated device-level data modeling can allow their device-level data models to be discovered and integrated into higher-level analytic models. For example, device-level templates 424 or other device-level models on the industrial devices 402 can be discovered by higher-level systems (e.g., analytic systems 1210, 1204, or 1302, ERP systems, maintenance systems, etc.) and integrated into high-level analytic models associated with these systems. In this way, smart tags 422 and their associated modeling metadata implement data engineering at the device level with the assistance of the modeling templates 424, and the resulting device-level data models can be discovered by and pulled into higher-level systems without requiring manual configuration. Modeling data at the device layer in this way can facilitate automated integration into these higher-level systems in a manner that is agnostic to the type of system consuming the data. Smart tags 422 can also simplify integration of distributed analytic architectures by defining the input/output structures for communication between distributed systems and analytics engines.

In general, smart tag modeling contextualizes data at low levels, and this contextualization is maintained—and enhanced—as the data moves to higher levels of the enterprise. For example, a smart tag 422 associated with a pump or other industrial asset can be modeled in a controller with contextual metadata based on information available at the controller (e.g., relationships to other data tags as defined by the templates 424, timestamps, device-level context, environmental data, etc.). At higher levels, the smart tag's data and associated contextual metadata (including encapsulated domain expertise built into the structure of the smart tag 422 itself) can be supplemented with maintenance data or other information available at the higher levels, thereby enhancing the data model as the data moves upward. Summing and contextualizing data at the lowest layers—e.g., the device layers—can ease integration of data with higher-level systems by removing the burden of learning correlations and contexts from these high-level systems. Propagating these device-level model—as represented by the device-level contextual metadata—to higher levels can also allow the device-level models to be consumed by these higher levels without the need to push data down to the device level for analysis.

This general approach can be used to progressively add layers of contextualization to industrial data as the data moves upward through the enterprise hierarchy. For example, when the gateway platform 302 receives modeled industrial data from the smart tags 422 of industrial devices—that is industrial data enhanced with device-level contextual metadata added by the industrial devices based on data modeling templates 424—the gateway platform's data modeling component 308 can further enhance the device-level model by supplementing the device-level contextual metadata with further modeling metadata based on the selected model template 502 for a desired business objective. Analytics can then be performed on the resulting modeled data based on this aggregate data model. In an example scenario, the progressively modeled data—comprising the industrial data values, their associated device-level contextual metadata, and the further modeling metadata added by the gateway platform's modeling component 308—can be analyzed by the gateway platform's gateway analytics component 310. Alternatively, the gateway platform's analytics interface component 312 may send the progressively modeled data to another analytic system for analysis (e.g., a cloud-based analytic system, an enterprise-level analytic system, an edge-level analytic system, etc.). In either case, this progressive, layered data modeling can be leveraged by the analytic system quickly and accurately yield actionable insights into the controlled industrial process relative to defined business objectives for which the models were designed.

In some embodiments, insights obtained by higher-level analytic systems can also be fed back to the device-level models on the industrial devices 420. For example, an AI engine or another type of analytic system at the enterprise level—or the gateway analytics component 310 of the gateway platform—may learn, based on AI analytics or traditional algorithms applied to smart tag data, a key variable indicative of an overall performance of an industrial asset represented by a smart tag cluster on the industrial device 402. Accordingly, the AI engine (or the data modeling component 308 in the case of the gateway platform 302) can adjust the data model structures of the smart tags to encode this key variable as part of the smart tag architecture; e.g., by adding a new data field defining a key variable to be monitored, or by modifying the device-level modeling templates 424 to reflect the new insight discovered at the higher-level analytic system or gateway platform 302. In this way, discoveries made by external or higher-level analytic systems are permanently encoded in the metadata of the relevant smart tags 422 at the device level, and this knowledge can be accessed by other analytic systems that reference the smart tags 422.

In some embodiments, the high-level analytic systems or the gateway platform 302 can also replace, update, or shape device-level analytic algorithms (e.g., analytic algorithms executed by device-level analytic systems 1304) based on insights obtained at these higher analytic levels. In some embodiments, this process can also work in the reverse direction—from the device-level to the higher levels—such that insights obtained by device-level analytic systems 1304 are fed upward to the higher-level analytic systems (e.g., edge-level analytic systems 1210, gateway analytics, cloud-based analytic system 1204, enterprise-level analytic system 1302, etc.), which update their analytic algorithms accordingly to reflect the device-level insights.

Figure 14:
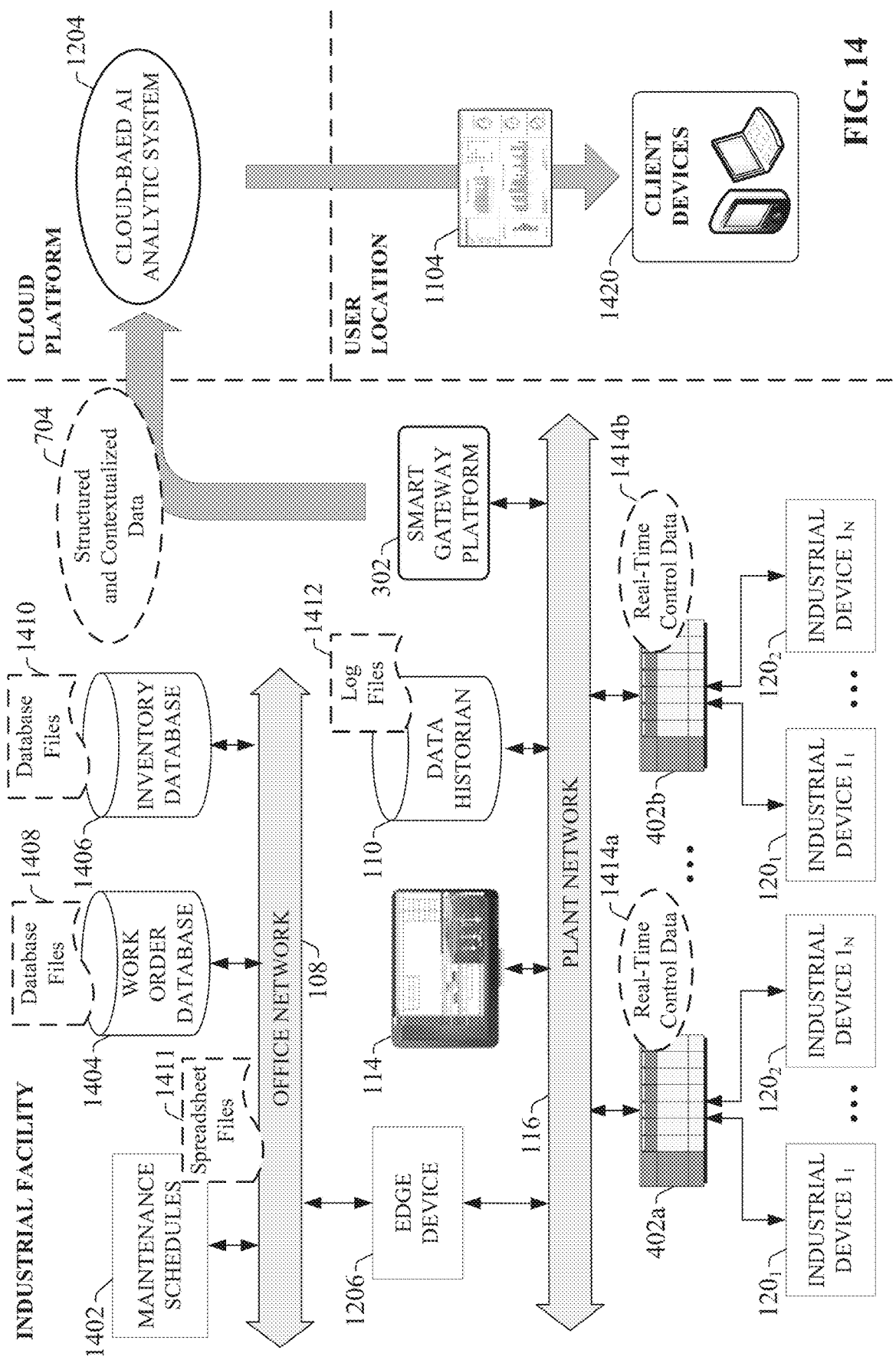
FIG. 14 is a diagram of an example industrial architecture in which a smart gateway platform feeds structured and contextualized data from disparate data sources throughout an industrial enterprise to a cloud-based analytic system executing on a cloud platform.

In addition to collection and modeling of raw and smart data from industrial devices, some embodiments of smart gateway platform 302 can also be configured to collect and model data from other types of data sources if dictated by the model 702 (that is, if the model 702 specifies that this supplemental data is useful for learning actionable insights into the business objective represented by the model 702). FIG. 14 is a diagram of an example industrial architecture in which a smart gateway platform 302 feeds structured and contextualized data 704 from disparate data sources throughout an industrial enterprise to a cloud-based analytic system 1204 executing on a cloud platform.

As described above, smart gateway platform 302 can normalize disparate structured data (e.g., from smart tags 422) and unstructured data, and model the data to encode relationships (correlations, causalities, etc.) between the data based on industry domain expertise encoded in the model 702. The platform 302 feeds this data 704 to AI analytic system 1204, which generates outcomes based on analysis of the structured and contextualized data 704. Data gathered by the smart gateway platform 302 can include both data from both plant floor devices and operational and supervisory software systems in the OT layer (e.g., MES systems, historians, inventory tracking systems, etc.). In the illustrated example, data collected by the smart gateway platform 302 for transformation and transmission to the cloud-based AI analytic system 1204 includes real-time control data 1414 generated by industrial devices 402. This real-time control data can include analog and digital data stored in the devices' data tables or associated with the devices' data tags. The control data can represent, for example, measured telemetry or sensor values read from a controlled industrial process (e.g., temperatures, pressures, flows, levels, speeds, etc.), measured digital values (e.g., part present sensor values, safety device statuses, switch settings, etc.), controlled analog and digital output values generated by the devices 402 and directed to industrial output devices of the controlled system, calculated performance metrics, etc.

Other data collected by the smart gateway platform 302 can include, but is not limited to, log files 1412 from a data historian device 110 residing on the plant network 116, spreadsheet files 1411 stored on a maintenance schedule server 1402 (residing on office network 108) and containing information regarding maintenance schedules for various machines throughout the industrial facility, work order database files 1408 stored on a work order database 1404 and containing work order information relating to products produced at the industrial facility, inventory database files 1410 stored on an inventory database 1406 and containing information regarding current and/or expected product availability, or other such data files. Although the present example presumes specific types of information contained in these respective data file types—e.g., maintenance schedule information stored as spreadsheet files 1411, work order information stored in work order database files 1408, etc.—it is to be appreciated that these information types are only intended to be exemplary, and that other types of information can be stored in the various file types. These diverse sets of data can be collected and transformed by smart gateway platform 302 in accordance with model 702 (specifying the desired business objective) and sent to the cloud-based analytic system 1204 as structured and contextualized data 704.

Since the smart gateway platform 302 normalizes and models the data collected from industrial devices 402, the platform 302 can present the resulting structured and contextualized data 704 in a consistent model that can be automatically discovered by software applications—e.g., AI or machine learning analytic systems—designed to consume this data. This can greatly simplify acquisition and analytics of data relevant to a desired business objective. By referencing a customized model 702 that defines data items (e.g., sensory inputs, key performance indicators, machine statuses, etc.) that are relevant to a desired industry- and machine-specific business objective (e.g., minimization of machine downtime, optimization of operation efficiency, etc.), the smart gateway platform 302 can significantly reduce the amount of storage required for data collection and analysis relative to streaming and storing all available time-series data from the plant floor. Smart gateway platform 302 also uses the model 702 to predefine and preformat data for consumption by higher level analytic models (e.g., high level object-oriented models) and analytics software. Moreover, integration of containerized software and micro-services with the smart gateway platform 302 can add new value at the edge by further modeling, persisting, and analyzing the data for business value.

Figure 15:
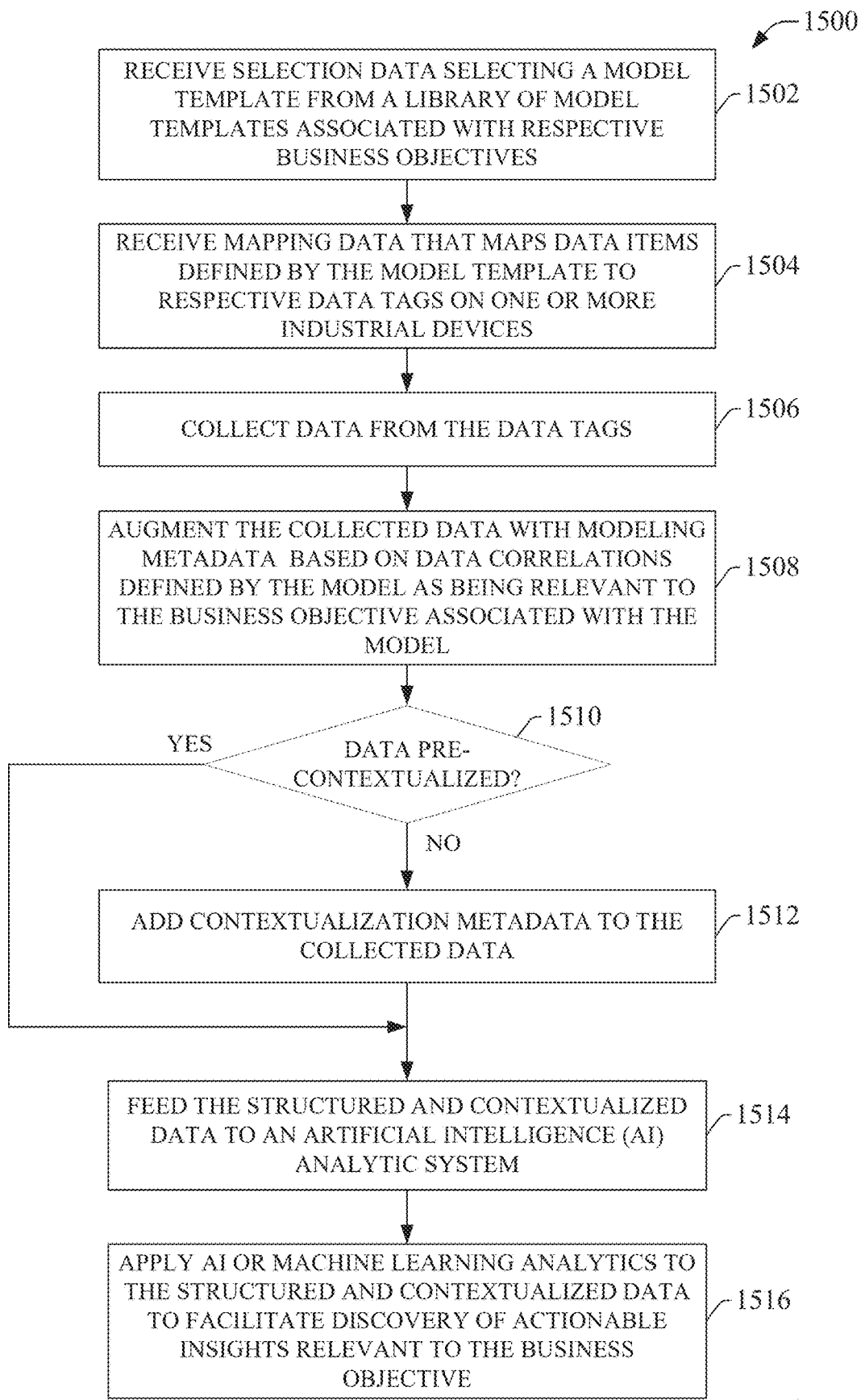
FIG. 15 is a flowchart of an example methodology for structuring industrial data and performing data analytics on the structured data to yield actionable insights relative to a desired business objective.

FIG. 15 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for structuring industrial data and performing data analytics on the structured data to yield actionable insights relative to a desired business objective. Initially, at 1502, selection data is received that selects a model template from a library of model templates associated with respective business objectives. The library of model templates can be stored on a smart gateway platform. Each model template can define, for a given business objective, a set of data items (e.g., sensor inputs, controller data tags, motor drive data tags, etc.) relevant to determining actionable insights into the associated business objective, as well as relationships (e.g., correlations, causalities, etc.) between the data items. The data items and the relationships therebetween are based on domain expertise or knowledge encoded into the model templates. Example business objectives for which model templates may be made available can include, but are not limited to, minimizing machine downtime, determining a cause of machine downtime, predicting machine downtime, increasing product output, optimizing energy efficiency, improving product quality, or other such objectives.

At 1504, mapping data is received at the smart gateway platform that maps the data items defined by the model template selected at step 1502 to respective data tags on one or more industrial devices. The data tags to which the data items are mapped may be standard industrial data tags or may be smart tags that store smart data that has been pre-contextualized by its associated smart industrial device.

At 1506, data is collected from the data tags by the smart gateway platform. In contrast to conventional big data analytic systems, only the data streams considered relevant to the desired business objective associated with the selected model template are collected. At 1508, the data items collected at step 1506 are augmented with modeling metadata based on data correlations defined by the model as being relevant to the business objective associated with the model. This can include, for example, adding metadata to respective data items to define the associated data value's mathematical relationship to other data items, as determined based on the relationships defined by the model. Metadata may also be added that defines the type of analytic problem (e.g., modeling, clustering, optimization, minimization, etc.) to be solved by subsequent AI analysis of the data, which is a function of the specific business objective for which actionable insights are desired. This augmentation step can also include normalization of the data items to a common format in preparation for collective AI analysis.

At 1510, a determination is made as to whether the data collected at step 1506 is pre-contextualized smart data from a smart industrial device. Such smart devices may be configured to pre-contextualize data items generated by the device with contextualization metadata that provides additional information regarding the context under which the data values were generated. This contextualization metadata may include, for example, an operating state of a machine at the time the data value was generated (e.g., running, idle, faulted, etc.), power statistics at the time the data was generated (e.g., voltages, currents, power consumption, etc.), or other such contextual metadata that may impart greater informational value to the data item.

If an item of the data collected at step 1506 is not pre-contextualized (NO at step 1510), the methodology proceeds to step 1512, where contextualization metadata is added to the data item by the smart gateway platform. In various embodiments, the smart gateway platform can select relevant items of contextualization data based on the model template selected at step 1502, or based on a model of the industrial enterprise that defines functional relationships between machines and devices.

If the data is already pre-contextualized (YES at step 1510), the methodology proceeds to step 1514 without adding contextualization metadata. At 1514, the structured and contextualized data resulting from steps 1508-1512 is fed to an artificial intelligence analytic system. At 1516, AI or machine learning analytics are applied to the structured and contextualized data to facilitate discovery of actionable insights relevant to the desired business objective. In some alternative embodiments, the structured and contextualized data can be fed to other types of analytics systems (e.g., a statistical analysis system) instead of an AI analytic system.

In some embodiments, with data models residing at the device level of an industrial enterprise using the data modeling templates 424 and smart tags 422 described above, data streams sourced by industrial devices 402 can be labeled at the device level and insights can be gleaned from these labeled data streams at higher levels (e.g., by analytic systems in the cloud, on edge devices, or at an enterprise level of an industrial enterprise). These contextualized and labeled data streams can be accessed using a publish-subscribe approach in some implementations, whereby contextualized data from the industrial devices 402 is provided to a broker system and labeled according to various topics. External systems, including analytic systems, can then subscribe to relevant topics, and the broker system will provide a subset of available data streams corresponding to the selected topics as a contextualized data stream.

Figure 16:
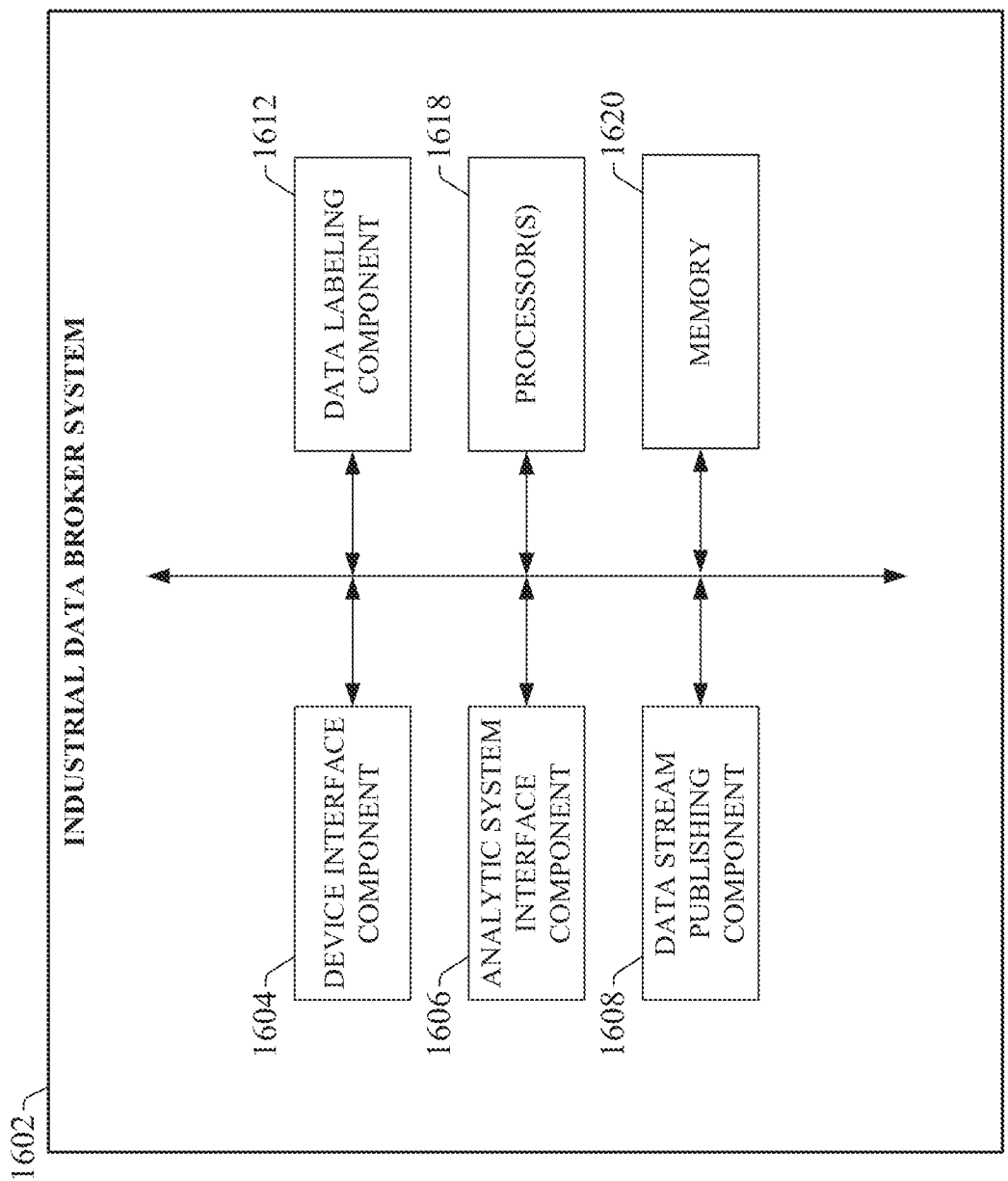
FIG. 16 is a block diagram of an example industrial data broker system.

FIG. 16 is a block diagram of an example industrial data broker system 1602 according to one or more embodiments of this disclosure. Industrial data broker system 1602 can include a device interface component 1604, an analytic system interface component 1606, a data stream publishing component 1608, a data labeling component 1612, one or more processors 1618, and memory 1620. In various embodiments, one or more of the device interface component 1604, analytic system interface component 1606, data stream publishing component 1608, data labeling component 1612, the one or more processors 1618, and memory 1620 can be electrically and/or communicatively coupled to one another to perform one or more of the functions of the industrial data broker system 1602. In some embodiments, components 1604, 1606, 1608, and 1612 can comprise software instructions stored on memory 1620 and executed by processor(s) 1618. Industrial data broker system 1602 may also interact with other hardware and/or software components not depicted in FIG. 16. For example, processor(s) 1618 may interact with one or more external user interface devices, such as a keyboard, a mouse, a display monitor, a touchscreen, or other such interface devices. In some embodiments, broker system 1602 can serve as a logical entity that is embedded in another device, including but not limited to an edge device, an industrial controller, or an HMI terminal.

Device interface component 1604 can be configured to receive or obtain data streams from industrial devices (e.g., industrial devices 402). In some scenarios, this data can comprise contextualized data that has been pre-modeled at the industrial device 402; e.g., by metadata associated with smart tags 422, from which the data is sourced, as described above. As such, the data streams include both data values associated with their corresponding data tags (e.g., time-series data) as well as pre-defined and learned correlations with other data tags or values which can assist AI systems to converge to actionable insights faster relative to uncorrelated data streams. The data streams received from the industrial devices may also be labeled according to one or more topics to which the data is relevant from an analytics perspective. The data streams may be published by the respective devices by data publishing components 410 associated with the devices in some embodiments, and can be received by device interface component 1604 via one or more secure network connections (e.g., a plant network, a cloud platform, public networks such as the internet, etc.).

Analytic system interface component 1606 can be configured to exchange data between the broker system 1602 and external analytic systems (e.g., analytic system 1102). This can include receiving requests from these external systems to subscribe to one or more labeled data streams, and publishing of selected data streams to respective analytic systems in accordance with the subscriptions. Data stream publishing component 1608 can be configured to process data topic subscription requests from analytics systems (e.g., AI analytic systems, machine learning systems, etc.), and to selectively publish data streams to subscribing analytic systems according to topic.

Data labeling component 1612 can be configured to apply labels to incoming data from industrial devices in scenarios in which the data is received from the devices without a label. The one or more processors 1618 can perform one or more of the functions described herein with reference to the systems and/or methods disclosed. Memory 1620 can be a computer-readable storage medium storing computer-executable instructions and/or information for performing the functions described herein with reference to the systems and/or methods disclosed.

Figure 17:
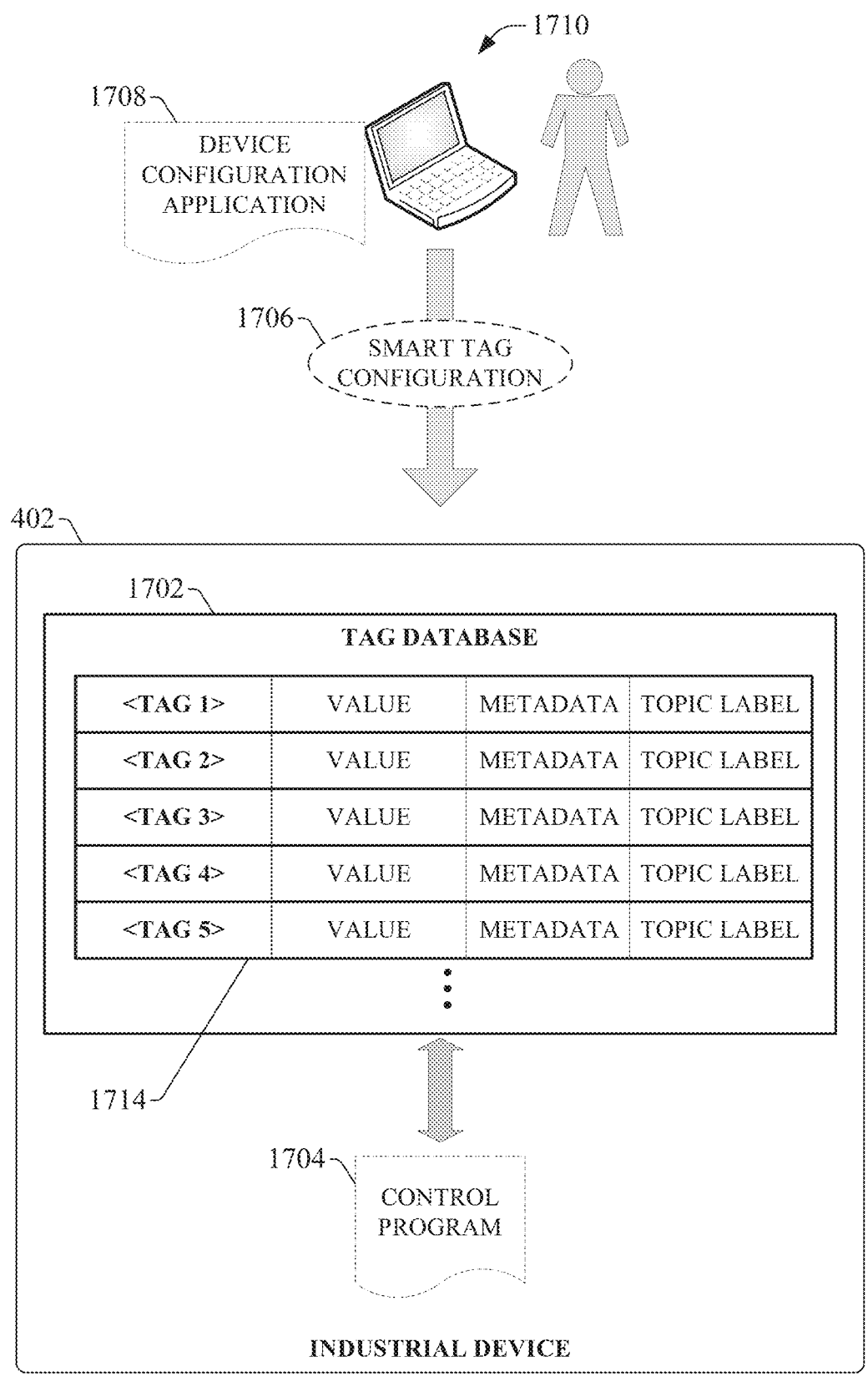
FIG. 17 is a diagram illustrating configuration of smart tags in a tag database of an industrial device that supports smart tags.

In an example scenario, a user can apply topic labels to selected smart tags 422 in an industrial controller or other industrial device 402 during control program development, along with other data tags to be used by the control program. FIG. 17 is a diagram illustrating configuration of smart tags in a tag database 1702 of an industrial device 402 that supports smart tags. Industrial device 402 may be, for example, an industrial controller (e.g., a programmable logic controller or other type of programmable automation controller) configured to execute an industrial control program 1704 to facilitate monitoring and control of an industrial machine or process. Industrial device 402 includes a tag database 1702 that stores data tag definitions 1714, which may include definitions of both standard data tags and smart tags 422. The data tag definitions 1714 can be configured by a user in tandem with development of control program 1704 (e.g., a ladder logic program, a sequential function chart program, etc.), and define data tags of various data types that are used to store and identify analog and digital data values generated and consumed by the control program 1704. Example standard data types that can be represented by tag definitions 1714 can include, for example, integer data types, real data types, Boolean data types, etc. In addition to these standard data types, one or more of the data tags can include smart tags 422 as described above.

In this example scenario, a user can configure both the control program 1704 and the data tag definitions 1714 using a device configuration application 1708 that executes on a client device 1710 (e.g., a laptop computer, a desktop computer, a tablet computer, etc.) that is communicatively interfaced to the industrial device 402. In various embodiments, client device 1710 can interface with the industrial device 402 over a hard-wired connection (e.g. a universal serial bus connection, an Ethernet connection, a serial connection, etc.) or over a wireless connection (e.g., near-field, WiFi, etc.) supported by user interface component 414. Device configuration application 1708 can execute a program development environment that can be used to develop control program 1704 and its associated data tags, including any smart tags 422 to be associated with one or more industrial assets to be controlled using control program 1704.

As described above, smart tags 422 included in the tag definitions 1714 can comprise metadata that pre-models and contextualizes the data for subsequent AI or machine learning analysis. At least some of this contextualization metadata can be based on predefined data modeling templates 424 as described above, such that the metadata defines relationships, correlations, and preferred analysis types to be performed on the smart tag data as gleaned from industry expertise encoded in the templates 424. Some of the contextualization metadata may also comprise user-defined contextualization set by a user as part of the smart tag configuration data 1706. Such user-defined contextualization may define customized relationships or correlations between data items to yield customized device-level models that conform to idiosyncrasies of the end user's particular industrial automation systems and equipment.

Using device configuration application 1708, the user can also configure the metadata associated with respective smart tags 422 define pre-processing to be performed on the smart tag's data at the device level in accordance with a given industrial application. For example, for a smart tag 422 that defines a state of a bottle filling machine to be controlled by industrial device 402, the user may specify the various states to be represented by the tag (e.g., Running, Home, Abnormal, Idle, etc.). In some embodiments, the smart tag configuration component 408 can support a number of pre-defined states that can be selected by the user and associated with a given smart tag 422 representing a machine or device state. In addition or alternatively, the user can define the names of one or more of the states to be associated with the smart tag 422.

In another example, for a smart tag 422 representing a velocity of a conveyor that feeds bottles to the filling machine, the user can specify maximum and minimum values for the velocity value. Accordingly, the smart tag 422 will not generate a velocity value that is outside the range defined by the specified maximum and minimum values, and may generate an error or alarm output if the measured velocity value exceeds the defined maximum or falls below the defined minimum. Another smart tag 422 representing an average temperature may be configured to average multiple analog temperature input values specified by the user in the metadata. For a smart tag 422 representing a product count (e.g., the number of filled bottles output by the filling machine), the user can configure the associated metadata to define the data tag that triggers an increment of the product count value (e.g., an input tag or another smart tag 422 representing a "fill cycle complete" event), as well as daily shift start and shift end times between which the value of the smart tag 422 will increment before being reset to zero.

In addition to the tag configuration aspects discussed above, users can also associate selected smart tags 422 with a topic label indicative of a topic to which the associated data is relevant. To this end, device configuration application 1708 can include configuration tools that allow the user to associate selected tags with relevant topic labels, which are submitted as part of smart tag configuration data 1706. Example topics with which smart tags can be associated can include, but are not limited to product quality, energy consumption, product throughput, machine runtime, machine downtime, or other such topics. In this way, smart tags 422 can be pre-labeled at the device layer according to relevant topics and published to their own channel (or multiple different relevant channels).

Some labels can also be added to selected smart tags automatically by the smart tag configuration component 408 based on inferences drawn from the automation layer. For example, smart tag configuration component 408 may determine a relevant topic to which a given smart tag 422 relates (e.g., product quality, maintenance, machine downtime, energy optimization, emissions reduction, OEE, lifecycle management, etc.) based on a determination of how the smart tag 422 is used in the industrial control program 1704, and label the smart tag 422 with this topic. In some embodiments, smart tag configuration component 408 may also automatically select a topic for a given smart tag 422 based on explicit or implied relevant topics obtained from data modeling templates 702. For example, in addition to the data modeling aspects described above, a data modeling template 702 may define relevant topics associated with respective smart tags 422, and smart tag configuration component 408 can automatically assign appropriate topic labels to these smart tags 422 based on these template definitions. In some embodiments, smart tag configuration component 408 may also infer relevant topics for respective smart tags 422 based on analysis of the data modeling defined by the templates 702.

Figure 18:
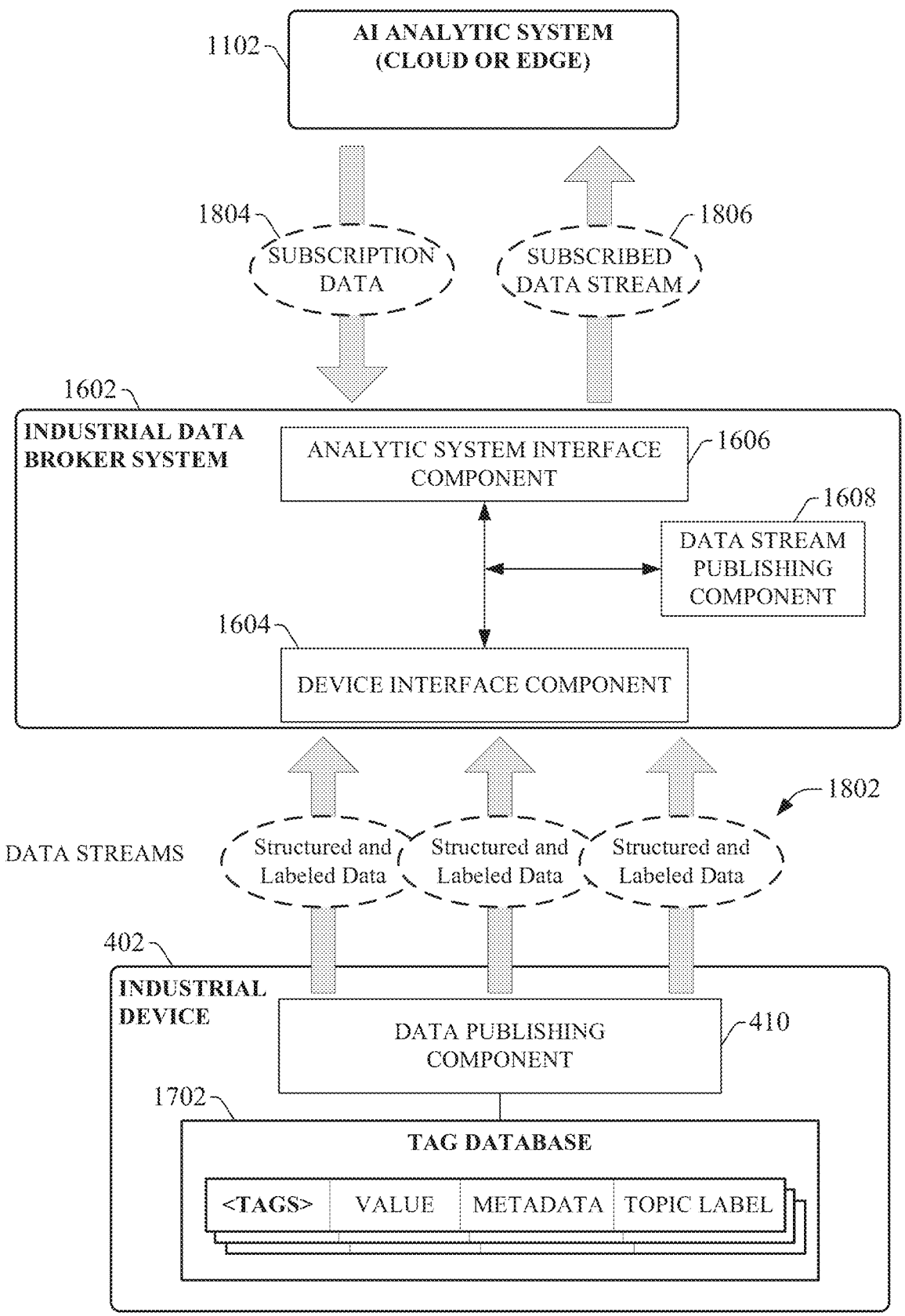
FIG. 18 is a diagram illustrating example high-level data flows of an industrial publish-and-subscribe architecture facilitated by an industrial data broker system in conjunction with smart tags.

FIG. 18 is a diagram illustrating example high-level data flows of an industrial publish-and-subscribe architecture facilitated by industrial data broker system 1602 in conjunction with smart tags 422. According to this example architecture, industrial devices 402 send their contextualized and labeled smart tag data to the broker system 1602 as data streams 1802, which are received and stored by the broker system's device interface component 1604. These data streams 1802 can include time-series data representing the values of their respective smart tags 422 over time, labels associated with each data stream, and pre-defined and learned correlations encoded by the smart tag's metadata (e.g., based on templates 424 or user-defined correlations).

Broker system 1602 can publish the received data streams 1802 to their own channels, and allows users or external systems—including analytic systems such as AI analytic system 1102— to subscribe to selected channels of interest according to topic. For example, an analytic system 1102 that seeks to optimize product quality of a given manufacturing line can submit subscription data 1804 to the broker system 1602 requesting to subscribe to a subset of available data streams having the Quality topic label. In this example, smart tags 422 and their associated data streams 1802 labeled with the Quality topic can encompass data that should be run through machine learning in order to optimize product quality. As described above, these tags can be pre-defined in the industrial devices 402 based on domain expertise as to which data values should be monitored or optimized to achieve best quality. The broker system's data stream publishing component 1608 processes the analytic system's subscription request and, in response, begins streaming a subset of the published data channels corresponding to the Quality label to the analytic system 1102 as a subscribed data stream 1806. This topic-based publish-subscribe approach pre-filters the total set of available plant-floor data such that only data streams relevant to a desired business outcome are provided to the analytic system 1102. Moreover, this filtered set of data streams is bundled with goal-specific contextualization information, relationships, and correlations in accordance with the device-level and/or gateway-level models, further reducing the time required for the analytic system 1102 to analyze the data streams 1806 and converge to an actionable outcome.

Although the example described above assumes that the data streams are labeled at the device level, in some configurations the data streams may be labeled by the broker system's data labeling component 1612. This implementation may be appropriate for processing data streams received from legacy industrial devices that do not support tag labeling at the device level. In such scenarios, the data labeling component 1612 allows users to define topics to be associated with selected unmodeled data streams received at the device interface component 1604, and applies appropriate topic labels to these data streams based on the user definitions prior to publishing. In some embodiments, the data labeling component 1612 may infer a relevant analytic topic for one or more items of unlabeled industrial data and label the data items with this inferred topic. The inferred topic for a given item of data may be learned based on a determination of the data item's role or relationships to other received data items, an analysis of the data model 702 (if accessible by the broker system 1602), an analysis of contextual metadata received from other related data items, an identity of the industrial device 402 from which the data item was received, or by other such inference techniques.

In some embodiments, smart tags 422, or the 424 templates used to configure smart tags, can be used to also configure which entities are permitted to see given sets of data. For example, owners of industrial devices 402 can configure not only topic labels for respective smart tags, but also identities of subscribers (e.g., OEMs) permitted to receive data streams from these smart tags 422. Alternatively, security for a data stream can be defined in an exclusionary manner by identifying subscribers who are not permitted to view the data. This subscriber permission information can be included in the smart tag metadata. On the broker side, when subscription data 1804 requesting to subscribe to a labeled data stream is received, data stream publishing component 1608 can first determine whether the requested data steam is labeled with a subscription limitation—that is whether permitted subscriptions to the requested data stream are to be limited to identified subscribers, or whether any subscribers are precluded from receiving the data stream—and establish a data channel to the subscribing entity only if the entity is permitted to receive the data stream.

This approach can allow different types of entities—end customers, OEMs, systems integrators, etc. —to share project or system runtime information in a secure manner that protects proprietary data. For example, an owner of an industrial asset built by an OEM may hold intellectual property on how that machine is run within their facility as part of a propriety industrial control process. Smart tag labeling can be used to organize selected sets of data that drive business outcomes that the OEM is to deliver. Broker system 1602 can leverage these smart tag labels to deliver this subset of data to the OEM by allowing the OEM to subscribe only to sets of data that the owner of the asset permits them to receive. In another example, OEMs that sell robots or other machines to various customers can remotely collect data anonymously from the machines they sell (e.g., for quality purposes, so that the OEM can engineer their machines for minimal downtime) without obtaining data relating to each customer's particular application.

In some embodiments, industrial data broker system 1602 can reside at the plant facility (e.g., embodied on an edge device) at which the industrial devices operate. Alternatively, broker system 1602 can be embodied on a cloud platform and execute as a cloud service, providing industrial data brokering services to a wide base of data publishers and subscribers across different industrial facilities.

Figure 19:
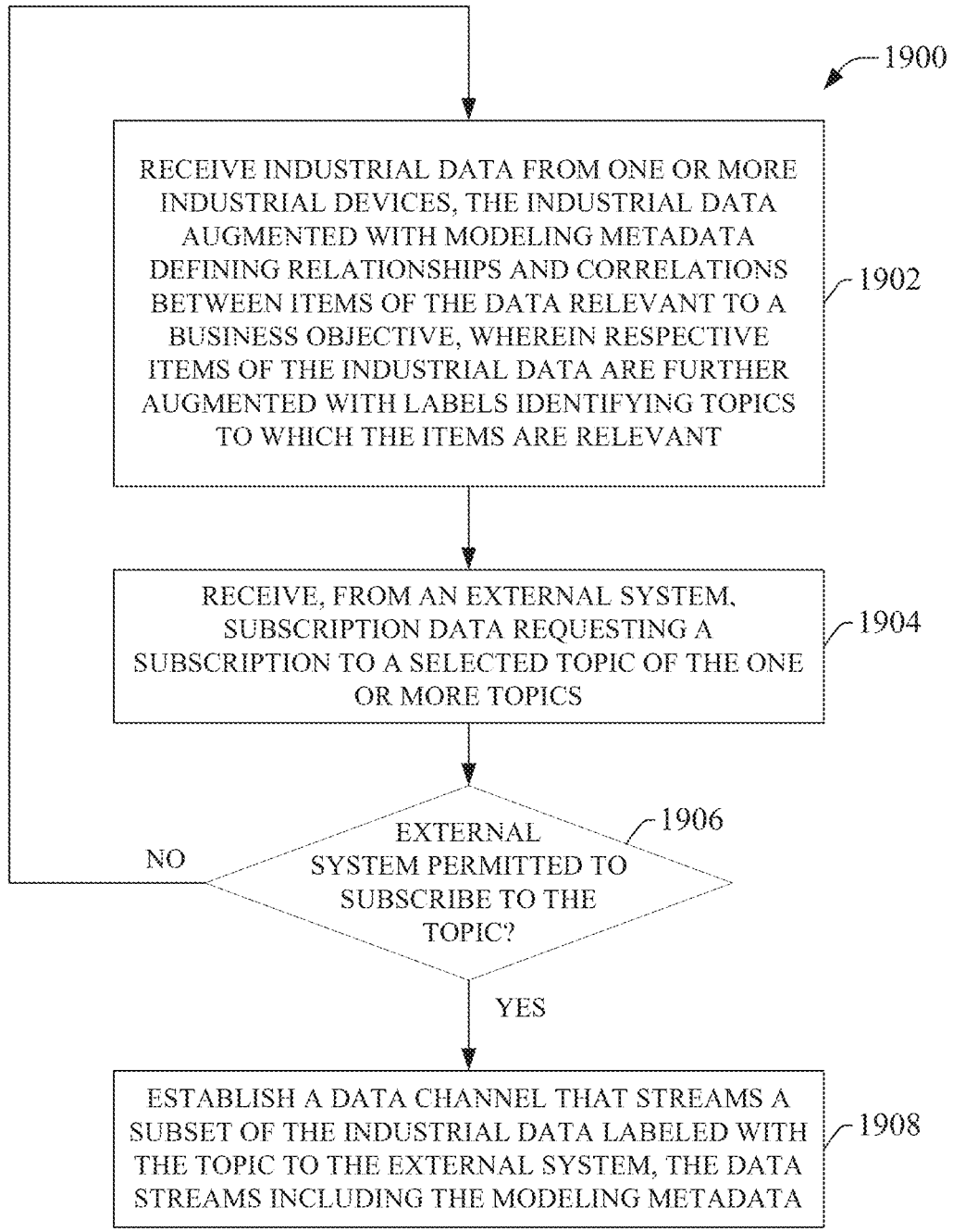
FIG. 19 is a flowchart of an example methodology for establishing contextualized data streams from industrial devices to external systems, including but not limited to AI or machine learning analytic systems.

FIG. 19 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 19 illustrates an example methodology 1900 for establishing contextualized data streams from industrial devices to external systems, including but not limited to AI or machine learning analytic systems. Initially, at 1900, industrial data is received from one or more industrial devices; e.g., at an industrial data broker system. The data can be received, for example, by an industrial data broker system. The industrial data can be sourced by smart tags residing on the devices, and can be augmented with modeling metadata defining relationships and correlations between items of the data relevant to a business objective. Respective items of the received data can further be augmented with labels identifying topics to which the respective data items are relevant from an analytics perspective. Example topics can include, but are not limited to, product quality, energy consumption, product throughput, machine runtime, emissions reduction, OEE, lifecycle management, or other such topics.

The data may be received by an industrial data broker system, which may reside at a plant facility in which the devices reside, or may execute as a cloud-based service to provide industrial data brokering services to a wide base of data publishers and subscribers. As an alternative to receiving the industrial data that has been pre-labeled and pre-modeled with modeling metadata, the broker system itself may apply labels and/or modeling metadata to the industrial data as it is received in accordance with data modeling templates maintained by the broker system.

At 1904, subscription data is received from an external system. The subscription data requests a subscription to a selected topic of the one or more topics represented by the labels. In an example scenario, the subscription data may be received from an external analytic system (e.g., an AI or machine learning system) tasked with analyzing data from an industrial system with a view to learning actionable insights with regard to a specified business goal (e.g., reducing emissions of the industrial system, improving product quality or throughput, optimizing energy utilization, etc.). In another example, the external system may be a data collection system associated with an entity external to the plant that owns the industrial devices, such as an OEM or systems integrator.

At 1906, a determination is made as to whether the external system is permitted to subscribe to the topic for which the subscription is requested at step 1904. This can be determined by the broker system based on security metadata associated with the respective items of industrial data, which can define limits on the entities permitted to view data labeled under a given topic. If the external system is permitted to subscribe (YES at step 1906), the methodology proceeds to step 1908, where a data channel is established that streams a subset of the industrial data that is labeled with the specified topic to the external system. The data streams can include both the data values associated with the data items labeled under the topic (e.g., time-series values associated with the corresponding smart tags at the industrial devices) as well as the modeling metadata, which structures and contextualizes the data to assist the subscribing system to more quickly and accurately converge on a relevant actionable insight. If the external system is not permitted to subscribe (NO at step 1906) the methodology returns to step 1902 without establishing the data channel.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
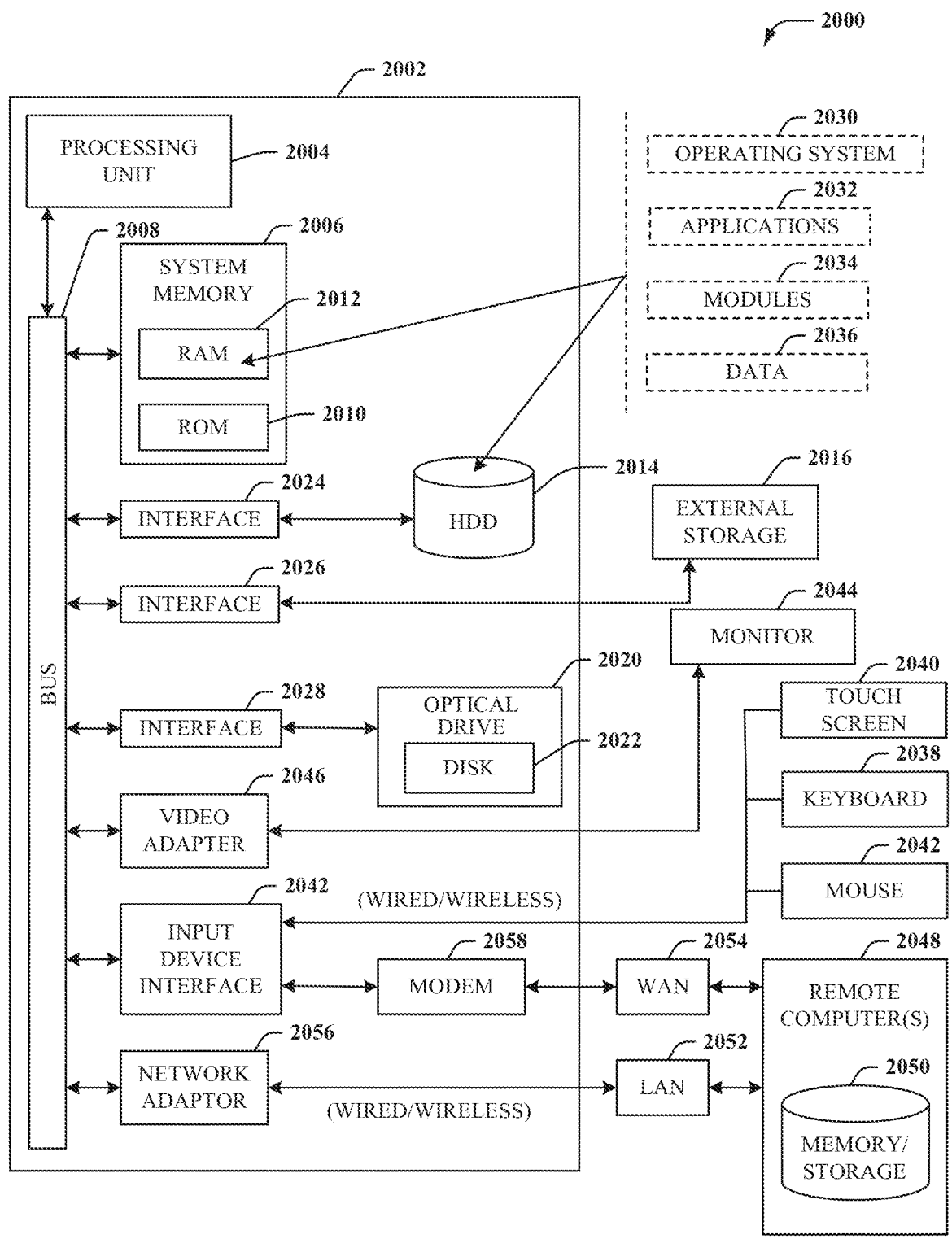
FIG. 20 is an example computing environment.
Figure 21:
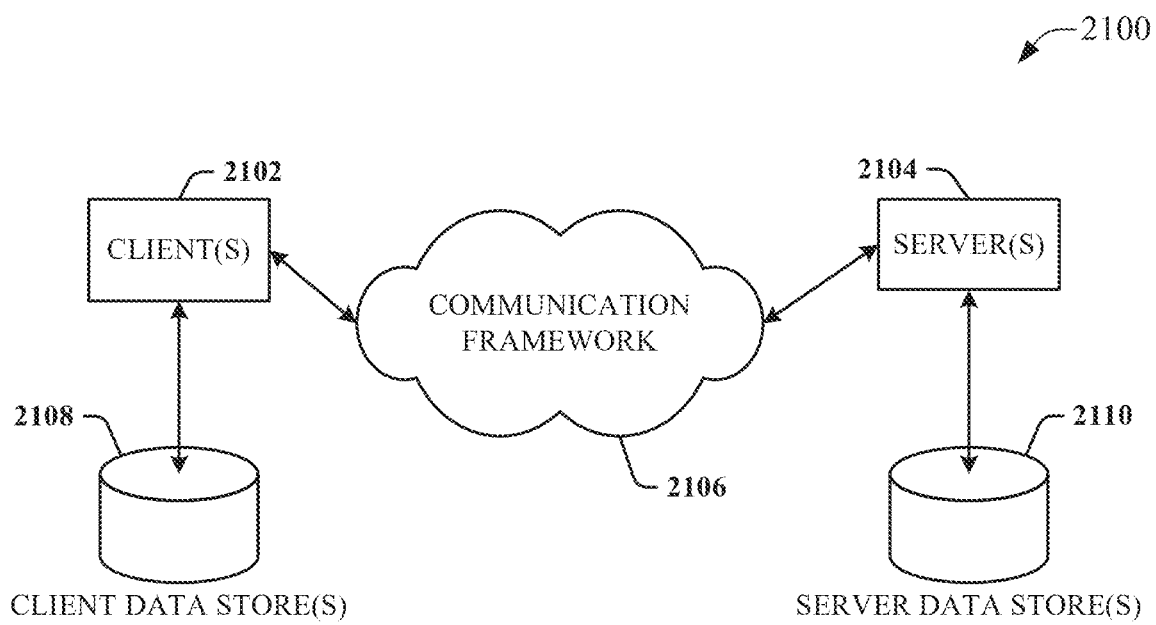
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and optical disk drive 2020 can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for application programs 2032. Runtime environments are consistent execution environments that allow application programs 2032 to run on any operating system that includes the runtime environment. Similarly, operating system 2030 can support containers, and application programs 2032 can be in the form of containers, which are lightweight, standalone, executable packages of software that include, e.g., code, runtime, system tools, system libraries and settings for an application.

Further, computer 2002 can be enable with a security module, such as a trusted processing module (TPM). For instance with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2044 or other type of display device can be also connected to the system bus 2008 via an interface, such as a video adapter 2046. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless access point (AP) disposed thereon for communicating with the adapter 2056 in a wireless mode.

When used in a WAN networking environment, the computer 2002 can include a modem 2058 or can be connected to a communications server on the WAN 2054 via other means for establishing communications over the WAN 2054, such as by way of the Internet. The modem 2058, which can be internal or external and a wired or wireless device, can be connected to the system bus 2008 via the input device interface 2042. In a networked environment, program modules depicted relative to the computer 2002 or portions thereof, can be stored in the remote memory/storage device 2050. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2052 or WAN 2054 e.g., by the adapter 2056 or modem 2058, respectively. Upon connecting the computer 2002 to an associated cloud storage system, the external storage interface 2026 can, with the aid of the adapter 2056 and/or modem 2058, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 2104. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
 a memory that stores executable components; and
 a processor, operatively coupled to the memory, that executes the executable components, the executable components comprising:
  a device interface component that collects industrial data streams from industrial devices, wherein the industrial data streams are associated with subscriber permission data defining at least one of entities permitted to subscribe to the industrial data streams or entities that are prohibited from subscribing to the industrial data streams;
  a data labeling component that applies labels to respective streams of the industrial data streams, the labels identifying analytic topics associated with the respective industrial data streams; and
  a data stream publishing component that, in response to receipt of subscription data from an analytic system requesting to subscribe to an analytic topic of the analytic topics, establishes a data channel to the analytic system that sends a subset of the industrial data streams determined to have a label, of the labels, corresponding to the analytic topic.

2. The system of claim 1, wherein the analytic topics comprise at least one of product quality, product throughput, machine runtime, machine downtime, energy consumption, overall equipment effectiveness, or lifecycle management.

3. The system of claim 1, wherein the data labeling component infers a label, of the labels, to be applied to an industrial data stream of the industrial data streams based on at least one of a determination of a relationship of the industrial data stream to other received data items, an analysis of a data model used to structure data contained in the industrial data stream, an analysis of contextual metadata received from related industrial data streams, or an identity of an industrial device from which the industrial data stream was received.

4. The system of claim 1, wherein at least one of the subset of the industrial data streams sends, to the analytic system, time-series values of one or more items of industrial data and contextualization data defining relationships between one or more items of the industrial data specific to a defined business objective.

5. The system of claim 4, wherein the defined business objective is at least one of maximization of product output, minimization of machine downtime, minimization of machine faults, optimization of energy consumption, prediction of machine downtime events, determination of a cause of a machine downtime, maximization of product quality, minimization of emissions, identification of factors that yield maximum product quality, identification of factors that yield maximum product output, or identification of factors that yield minimal machine downtime.

6. The system of claim 4, wherein the contextualization data is received from at least one of the industrial devices containing the one or more items of industrial data.

7. The system of claim 4, wherein the contextualization data further defines a type of analytic problem to be solved by the analytics system via analysis of the subset of the one or more items of industrial data.

8. The system of claim 1, wherein the data labeling component receives configuration data that defines the analytic topics and associates the analytic topics to selected data streams of the industrial data streams, and applies the labels to the respective streams based on the definition data.

9. The system of claim 1, wherein
the data stream publishing component sends the subset of the industrial data streams to the analytic system contingent on a determination, based on the subscriber permission data, that the analytic system is not prohibited from subscribing to the subset of the industrial data streams.

10. A method, comprising:
receiving, by a system comprising a processor, industrial data streams from industrial devices, wherein the industrial data streams are respectively associated with subscriber permission data defining at least one of entities permitted to subscribe to the industrial data streams or entities that are prohibited from subscribing to the industrial data streams;
assigning, by the system, labels to respective streams of the industrial data streams, wherein the labels identify analytic topics associated with the respective industrial data streams;
in response to receiving subscription data from an analytic system requesting to subscribe to an analytic topic of the analytic topics:
establishing, by the system, a data channel to the analytic system, and
sending, by the system via the data channel, a subset of the industrial data streams determined to have a label, of the labels, corresponding to the analytic topic.

11. The method of claim 10, wherein the analytic topics comprise at least one of product quality, product throughput, machine runtime, machine downtime, energy consumption, overall equipment effectiveness, or lifecycle management.

12. The method of claim 10, wherein the assigning comprises inferring a label, of the labels, to be applied to an industrial data stream of the industrial data streams based on at least one of a determination of a relationship of the industrial data stream to other received data items, an analysis of a data model used to structure data contained in the industrial data stream, an analysis of contextual metadata received from related industrial data streams, or an identity of an industrial device from which the industrial data stream was received.

13. The method of claim 10, wherein the sending comprises sending, by the system via at least one of the subset of the industrial data streams, time-series values of one or more items of industrial data and contextualization data defining relationships between one or more items of the industrial data specific to a defined business objective.

14. The method of claim 13, wherein the defined business objective is at least one of maximization of product output, minimization of machine downtime, minimization of machine faults, optimization of energy consumption, prediction of machine downtime events, determination of a cause of a machine downtime, maximization of product quality, minimization of emissions, identification of factors that yield maximum product quality, identification of factors that yield maximum product output, or identification of factors that yield minimal machine downtime.

15. The method of claim 13, wherein the receiving of the industrial data streams comprises receiving the contextualization data from at least one of the industrial devices containing the one or more items of industrial data.

16. The method of claim 13, wherein the contextualization data further defines a type of analytic problem to be solved by the analytics system via analysis of the subset of the one or more items of industrial data.

17. The method of claim 10, further comprising receiving, by the system, configuration data that defines the analytic topics and that associates the analytic topics to selected data streams of the industrial data streams,
wherein the assigning comprises assigning the labels to the respective streams based on the definition data.

18. The method of claim 10,
wherein the sending comprises, in response to determining, based on the subscriber permission data, that the analytic system is not prohibited from subscribing to the subset of the industrial data streams, sending the subset of the industrial data streams to the analytic system.

19. A non-transitory computer-readable medium having stored thereon instructions that, in response to execution, cause a system comprising a processor to perform operations, the operations comprising:
collecting industrial data streams from industrial devices, wherein the industrial data streams are associated with subscriber permission data defining at least one of entities permitted to subscribe to the industrial data streams or entities that are prohibited from subscribing to the industrial data streams;
designating labels to respective streams of the industrial data streams, wherein the labels identify analytic topics associated with the respective industrial data streams;
in response to receiving subscription data from an analytic system requesting to subscribe to an analytic topic of the analytic topics:
creating a data channel to the analytic system, and
sending, via the data channel, a subset of the industrial data streams determined to have a label, of the labels, corresponding to the analytic topic.

20. The non-transitory computer-readable medium of claim 19, wherein the analytic topics comprise at least one of product quality, product throughput, machine runtime, machine downtime, energy consumption, overall equipment effectiveness, or lifecycle management.

* * * * *